(12) United States Patent
Yoshinobu et al.

(10) Patent No.: US 12,409,438 B2
(45) Date of Patent: Sep. 9, 2025

(54) ADSORPTION FILTER

(71) Applicant: KURARAY CO., LTD., Kurashiki (JP)

(72) Inventors: Hiroe Yoshinobu, Okayama (JP);
Tetsuya Hanamoto, Okayama (JP);
Keita Takahashi, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 18/850,146

(22) PCT Filed: Mar. 20, 2023

(86) PCT No.: PCT/JP2023/010837
§ 371 (c)(1),
(2) Date: Sep. 24, 2024

(87) PCT Pub. No.: WO2023/189806
PCT Pub. Date: Oct. 5, 2023

(65) Prior Publication Data
US 2025/0108355 A1   Apr. 3, 2025

(30) Foreign Application Priority Data

Mar. 29, 2022 (JP) ................. 2022-053499

(51) Int. Cl.
*B01J 20/20* (2006.01)
*B01J 20/28* (2006.01)
*B01J 20/30* (2006.01)
*C02F 1/28* (2023.01)
*C02F 101/20* (2006.01)
*C02F 101/32* (2006.01)

(52) U.S. Cl.
CPC ......... *B01J 20/20* (2013.01); *B01J 20/28011* (2013.01); *B01J 20/2803* (2013.01); *B01J 20/28042* (2013.01); *B01J 20/28076* (2013.01); *B01J 20/3007* (2013.01); *B01J 20/3021* (2013.01); *C02F 1/283* (2013.01); *C02F 2101/20* (2013.01); *C02F 2101/322* (2013.01)

(58) Field of Classification Search
CPC ............. B01J 20/28011; B01J 20/2803; B01J 20/28042; B01J 20/28076; B01J 20/3007; B01J 20/3021; C02F 1/283
See application file for complete search history.

(56) References Cited

U.S. PATENT DOCUMENTS

| | | | |
|---|---|---|---|
| 10,987,650 B2 * | 4/2021 | Takahashi | ............... C01B 32/30 |
| 2012/0132578 A1 * | 5/2012 | Yoshinobu | ......... B01J 20/28004 502/417 |
| 2020/0398247 A1 * | 12/2020 | Takahashi | .......... B01J 20/28071 |

FOREIGN PATENT DOCUMENTS

| | | | | |
|---|---|---|---|---|
| JP | 2015033680 A | 2/2015 | | |
| JP | 2016140788 A | 8/2016 | | |
| JP | 2020019016 A | 2/2020 | | |
| JP | 2021122778 A | 8/2021 | | |
| WO | WO-2011016548 A1 | 2/2011 | | |
| WO | WO-2016121590 A1 * | 8/2016 | ............. B01D 39/14 | |
| WO | WO-2019131305 A1 | 7/2019 | | |

OTHER PUBLICATIONS

International Search Report issued Jun. 6, 2023 in PCT/JP2023/010837 (with English translation), 4 pages.
Written Opinion issued Jun. 6, 2023 in PCT/JP2023/010837 (with English translation), 8 pages.
International Preliminary Report on Patentability and Written Opinion issued Oct. 10, 2024 in PCT/JP2023/010837 (with English translation), 12 pages.
Notice of Opposition issued Jun. 9, 2025, in corresponding Japanese Patent Application No. 2024-511872 (with English translation summary), 14 pages.
Office Action issued Jun. 23, 2025, in corresponding Japanese Patent Application No. 2024-511872 (with machine English translation), 19 pages.

* cited by examiner

*Primary Examiner* — Yong L Chu
(74) *Attorney, Agent, or Firm* — Element IP, PLC

(57) ABSTRACT

An adsorption filter according to the present invention is an adsorption filter including a molded body containing activated carbon and a binder. A pore volume of the adsorption filter at a pore diameter of 15 μm or more and 30 μm or less at a volume basis of the adsorption filter under measurement by mercury intrusion porosimetry is 0.06 $cm^3$/cc to 0.30 $cm^3$/cc.

5 Claims, 9 Drawing Sheets

CUT PIECE

CUT PIECE IN 1 cm SQUARE

MEASUREMENT

ADSORPTION FILTER

TECHNICAL FIELD

The present invention relates to an adsorption filter comprising a molded body containing activated carbon and a binder.

BACKGROUND ART

In recent years, safety and hygienic concerns increased with regard to water quality of tap water, and it has been desired to remove harmful substances contained in tap water, such as free residual chlorine, volatile organic compounds (VOC) including trihalomethanes, agricultural chemicals, and musty odors.

Adsorption filters including an activated carbon molded body are generally used to remove the harmful substances.

Such an adsorption filter including the activated carbon molded body is desired to have a removal performance on a turbid component (a particulate substance) contained in tap water. For instance, Patent Literature 1 discloses a method of producing a turbidity reduction filter available for a longer time by adjusting a stiffness difference between an inflow filtering part and an outflow filtering part of an activated carbon molded body. Besides, for instance, Patent Literature 2 discloses a water purification cartridge including an activated carbon molded body and a non-woven fabric to achieve both the high turbidness removal performance and the sufficiently long life against clogging. Furthermore, for instance, Patent Literature 3 discloses an activated carbon molded body produced by molding a mixture including: powdered activated carbon (a) having a median diameter of 80 μm to 120 μm and a standard deviation σ g of 1.3 to 1.9 in a particle size distribution; and a fibrous binder (b). Patent Literature 3 states that the activated carbon molded body has excellent adsorptive removability for free residual chlorine, volatile organic compounds, CAT, and 2-MIB, and further has excellent turbidity filterability.

A turbidness removal performance test to be conducted on a filter including an activated carbon molded body is generally defined in, for example, Japanese Industrial Standards (JIS) S 3201-2019. The test defines kaolin of about 1 μm to 20 μm as a turbid component (a particulate substance) and evaluates a removal performance on the substance. An evaluation of the turbidness removal performance of the activated carbon molded body in each of Patent Literature 1, Patent Literature 2, and Patent Literature 3 is also made on the basis of this test.

Recently, there is an increasing demand for an adsorption filter including an activated carbon molded body having a removal performance on ultrafine particles with a particle size of 1 μm or less in addition to particles with a particle size of, typically, 1 μm to 20 μm from the viewpoint of safety and hygienic concerns. For instance, Patent Literature 4 discloses, as the adsorption filter, a molded adsorber having an improved fine particle removal performance under the definition that a particulate substance has a median diameter D50 falling within a predetermined range and a content rate of the particulate substances at a particle size of 10 μm or less falls within a predetermined range.

CITATION LIST

Patent Literature

Patent Literature 1: Japanese Unexamined Patent Publication No. 2015-033680
Patent Literature 2: Japanese Unexamined Patent Publication No. 2016-140788
Patent Literature 3: International Unexamined Patent Publication No. 2011/016548
Patent Literature 4: Japanese Unexamined Patent Publication No. 2021-122778

SUMMARY OF INVENTION

The present invention has an object of providing an adsorption filter that achieves both the excellent water permeability with low water flow resistance and the great ultrafine particle removal performance, and that is available for a long time.

The present inventors accomplished the present invention as a result of intensive study to solve the disadvantages described above.

An adsorption filter according to a first aspect of the present invention is an adsorption filter comprising:
a molded body containing activated carbon and a binder, wherein
a pore volume of the adsorption filter at a pore diameter of 15 μm or more and 30 μm or less at a volume basis of the adsorption filter under measurement by mercury intrusion porosimetry is 0.06 cm$^3$/cc to 0.30 cm$^3$/cc.

An adsorption filter according to a second aspect of the present invention is an adsorption filter comprising:
a molded body containing activated carbon and a binder, wherein
D50 is 30 μm or more and 110 μm or less and D90 is 110 μm or more in a cumulative particle size distribution at a volume basis of the activated carbon, and
a particle content rate of the activated carbon at a particle diameter of 10 μm or less is 1.2 volume % or more and 8.9 volume % or less.

DESCRIPTION OF EMBODIMENTS

Figure 1:
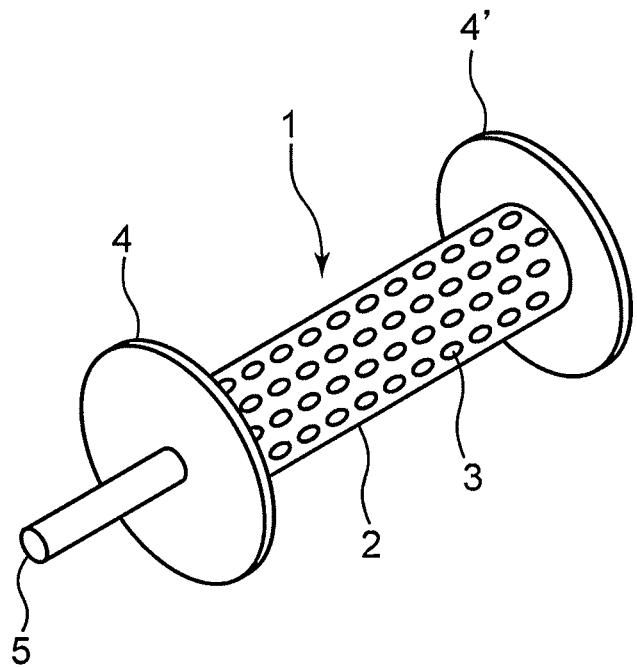
FIG. 1 is a perspective view of an example mold for preparing an adsorption filter in an embodiment.

As aforementioned, the molded adsorber described in Patent Literature 4 has an improved fine particle removal performance under the definition that a particulate substance has a median diameter D50 falling within a predetermined range and a content rate of the particulate substance at a particle diameter of 10 μm or less falls within a predetermined range. However, the adsorption filter having the improved fine particle removal performance, in particular, an improved ultrafine particle removal performance, is required to have a decreased size of voids in the adsorption filter with finer particles of the activated carbon as a raw material. Such requirement leads to an increase in the water flow resistance of the adsorption filter. From these perspectives, an adsorption filter having both the excellent water permeability with low water flow resistance and the great ultrafine particle removal performance is demanded.

In addition, such an adsorption filter having a fine particle size of activated carbon as a raw material as the molded adsorber described in Patent Literature 4 may suffer from clogging at an earlier stage due to a turbid substance of about 1 μm to 20 μm. As a result, a removal performance of the adsorption filter may decrease and the life of the adsorption filter may be shorter.

A possible way for a longer life of the adsorption filter includes a work of making water flow in a direction opposite to a water flow direction in the adsorption filter for a predetermined time period to solve clogging attributed to a turbid substance. The work is also referred to as a "backwash work" in the description. However, it is assumed that the adsorption filter containing the activated carbon having a fine particle size face difficulty in discharging the turbid substance even through performing a backwash work.

In contrast, the present invention can provide an adsorption filter that achieves both the excellent water permeability with lower water flow resistance and the great ultrafine particle removal performance, and that is available for a long time. The adsorption filter according to the present invention can efficiently restore a flow rate by performing a backwash work, and thus the filter life can be extended.

Hereinafter, the embodiment of the present invention will be described in detail. The scope of the present invention is not limited to the embodiment described hereafter, and various changes may be made without affecting the gist of the present invention.

An adsorption filter in the embodiment is an adsorption filter comprising a molded body containing activated carbon and a binder, and a pore volume of the adsorption filter at a pore diameter of 15 μm or more and 30 μm or less at a volume basis of the adsorption filter under measurement by mercury intrusion porosimetry is 0.06 cm³/cc to 0.30 cm³/cc.

Alternatively, an adsorption filter in the embodiment is an adsorption filter comprising a molded body containing activated carbon and a binder, wherein D50 is 30 μm or more and 110 μm or less, D90 is 110 μm or more in a cumulative particle size distribution at a volume basis of the activated carbon, and a particle content rate of the activated carbon at a particle diameter of 10 μm or less is 1.2 volume % or more and 8.9 volume % or less.

In the description, "D50" means a 50% particle diameter in a cumulative particle size distribution at a volume basis. Besides, "D90" means a 90% particle diameter in the cumulative particle size distribution at the volume basis. Further, "D10" measured in Examples to be described later means a 10% particle diameter in the cumulative particle size distribution at the volume basis.

The adsorption filter in the embodiment having any one of these configurations achieves both the excellent water permeability with low water flow resistance and the great ultrafine particle removal performance and is available for a long time.

Specifically, in the embodiment, physical properties, a mixing ratio, and other parameters of the activated carbon as a raw material are appropriately selected and/or adjusted to appropriately regulate a void volume in the filter. This allows a pore volume in a predetermined pore diameter range to fall within a specific range. Alternatively, the embodiment adopts, as activated carbon being a raw material, activated carbon that has D50 and D90 each falling within a predetermined range in the cumulative particle size distribution at the volume basis and has a content rate, at a particle diameter of a specified value or less, falling within a predetermined range. This results in providing the adsorption filter that has both the excellent water permeability with low water flow resistance and the great ultrafine particle removal performance, and that is available for a long time.

[Physical Properties of the Adsorption Filter]

In the adsorption filter in the embodiment, a pore volume of the adsorption filter at a pore diameter of 15 μm or more and 30 μm or less at a volume basis of the adsorption filter (hereinafter, simply referred to as a "pore volume at the pore diameter of 15 μm or more and 30 μm or less" as well) under measurement by mercury intrusion porosimetry is 0.06 cm³/cc to 0.30 cm³/cc. If the pore volume at the pore diameter of 15 μm or more and 30 μm or less is 0.06 cm³/cc or more, it allows the adsorption filter to have the excellent water permeability with less clogging attributed to a turbid substance, and to be favorably available for a long time. A backwash work further enables the adsorption filter to efficiently restore a flow rate and allows the adsorption filter to have a much longer life. If the pore volume at the pore diameter of 15 μm or more and 30 μm or less is 0.30 cm³/cc or less, it allows the adsorption filter to have a great ultrafine particle removal performance.

The pore volume at the pore diameter of 15 μm or more and 30 μm or less is preferably 0.08 cm³/cc or more, more preferably 0.10 cm³/cc or more, still more preferably 0.12 cm³/cc or more, and particularly preferably 0.13 cm³/cc or more. The pore volume at the pore diameter of 15 μm or more and 30 μm or less is preferably 0.27 cm³/cc or less, more preferably 0.25 cm³/cc or less, still more preferably 0.23 cm³/cc or less, and particularly preferably 0.21 cm³/cc or less.

Besides, in the adsorption filter in the embodiment, a pore volume of the adsorption filter at a pore diameter of 7 μm or less at a volume basis of the adsorption filter (hereinafter, simply referred to as a "pore volume at the pore diameter of 7 μm or less") under the measurement by the mercury intrusion porosimetry is preferably 0.10 cm³/cc or more. If the pore volume at the pore diameter of 7 μm or less is 0.10 cm³/cc or more, the adsorption filter can obtain a prominently great ultrafine particle removal performance.

The pore volume at the pore diameter of 7 μm or less is more preferably 0.12 cm³/cc or more, and still more preferably 0.14 cm³/cc or more. An upper limit of the pore volume at the pore diameter of 7 μm or less is not particularly limited, but the pore volume at the pore diameter 7 μm or less is, for example, preferably 0.50 cm$^3$/cc or less, more preferably 0.45 cm$^3$/cc or less, and still more preferably 0.40 cm$^3$/cc or less.

Furthermore, in the adsorption filter in the embodiment, a total pore volume of the adsorption filter at a volume basis of the adsorption filter (hereinafter, simply referred to as a "total pore volume") under the measurement by the mercury intrusion porosimetry is preferably 0.50 cm$^3$/cc to 0.73 cm$^3$. If the total pore volume is 0.50 cm$^3$/cc or more, the adsorption filter can obtain a greater water permeability, and thus is preferably applicable to, for example, a water purification filter. If the total pore volume is 0.73 cm$^3$/cc or less, it allows the filter to hold a sufficiently large amount of the activated carbon and to have a good adsorption performance as typical filter.

The total pore volume is more preferably 0.53 cm$^3$/cc or more, and still more preferably 0.56 cm$^3$/cc or more. The total pore volume is more preferably 0.70 cm$^3$/cc or less, and still more preferably 0.67 cm$^3$/cc or less.

In the description, the pore volume at the pore diameter of 15 μm or more and 30 μm or less, the pore volume at the pore diameter of 7 μm or less, and the total pore volume are measurable by mercury intrusion porosimetry with a mercury intrusion porosimetry pore volume measurement device ("MicroActive AutoPore V 9620" manufactured by Micromeritics Instrument Corporation) as in Examples to be described later. In each Example to be described later, a measurement sample having a size of about 1 cm square is taken from a molded layer of a filter, but the size of the measurement sample is preferably and appropriately changed depending on a size of the filter. For example, a measurement sample having a size of about 5 mm square is desired to be measured for a spout-in type filter.

Various ways may be employable to regulate a value of each of the pore volume at the pore diameter of 15 μm or more and 30 μm or less, the pore volume at the pore diameter of 7 μm or less, and the total pore volume in the adsorption filter in the embodiment as described heretofore. For instance, the value is regulatable by appropriately selecting and/or adjusting physical properties and a mixing amount of activated carbon as a raw material, a mixing ratio of two or more kinds of activated carbon having different physical properties in use of the two or more kinds, a kind and a mixing amount of a binder being a raw material, a mixing amount of an optional component being a raw material, and processing conditions including a suction pressure, a drying time, and other conditions in producing the adsorption filter. In particular, as described in detail later, the pore volume at the pore diameter of 15 μm or more and 30 μm or less is regulatable by adjusting each of D50 and D90 of the activated carbon as a raw material to fall within a predetermined range, and adjusting a particle content rate (volume %) of the activated carbon as a raw material at the particle diameter of 10 μm or less m to fall within a predetermined range.

The adsorption filter in the embodiment preferably has a density (hereinafter, simply referred to as a "filter density" as well) of 0.59 g/cm$^3$ or less. If the filter density is 0.59 g/cm$^3$ or less, the filter can reliably maintain lower water flow resistance, and thus is preferably applicable to, for example, a water purification filter. Furthermore, it is possible to achieve less clogging in the filter. The filter density is preferably 0.35 g/cm$^3$ or more. If the filter density is 0.35 g/cm$^3$ or more, the filter can have a preferable total amount of the activated carbon and can reliably maintain a great removal performance on ultrafine particles and other normal harmful substances.

The filter density is more preferably 0.38 g/cm$^3$ or more, still more preferably 0.40 g/cm$^3$ or more, and particularly preferably 0.42 g/cm$^3$ or more. The filter density is more preferably 0.57 g/cm$^3$ or less, still more preferably 0.55 g/cm$^3$ or less, and particularly preferably 0.53 g/cm$^3$ or less. In the description, the filter density is measurable by ways to be described in Examples in detail later.

Various ways are employable to regulate a value of the filter density. For instance, the value is regulatable by appropriately selecting and/or adjusting physical properties and a mixing amount of activated carbon as a raw material, a mixing ratio of two or more kinds of activated carbon having different physical properties in use of the two or more kinds, a kind and a mixing amount of a binder being a raw material, a mixing amount of an optional component being a raw material, and processing conditions including a suction pressure, a drying time, and other conditions in producing the adsorption filter.

The adsorption filter in the embodiment preferably has a benzene saturated adsorption amount of 18% to 35%. In the description, the benzene saturated adsorption amount of the adsorption filter is measurable from an increased weight amount (%) of a sample when a mass become constant after air containing solvent vapor having a concentration of ¹/₁₀ of a solvent saturation concentration is made pass through at 25° C. in accordance with JIS K 1474 (2014) which is an activated carbon test method.

If the benzene saturated adsorption amount is 18% or more, the filter can obtain a sufficiently high removal performance particularly on organic matters. If the benzene saturated adsorption amount is 35% or less, it leads to prevention of an increase in the pore diameter in an excessively activated state and avoidance of a decrease in an adsorption holding performance on harmful substances. The benzene saturated adsorption amount is more preferably 20% or more, and still more preferably 22% or more. The benzene saturated adsorption amount is more preferably 33% or less, and still more preferably 30% or less.

For instance, a value of the benzene saturated adsorption amount of the adsorption filter in the embodiment is regulatable by appropriately selecting and/or adjusting physical properties and a mixing amount of activated carbon as a raw material, a mixing ratio or rate of two or more kinds of activated carbon having different physical properties in a case of use of the two or more kinds.

[Configuration of the Adsorption Filter]

The adsorption filter in the embodiment comprises a molded body containing activated carbon and a binder.

(Activated Carbon)

Activated carbon being a raw material for the adsorption filter in the present embodiment has D50 of 30 μm or more and 110 μm or less and D90 of 110 μm or more in a cumulative particle size distribution at a volume basis of the activated carbon. A particle content rate of the activated carbon at a particle diameter of 10 μm or less is 1.2 volume % or more and 8.9 volume % or less.

Use of the activated carbon having this particle size as a raw material leads to achievement in providing an adsorption filter having a pore volume falling within a range of 0.06 cm$^3$/cc to 0.30 cm$^3$/cc at the pore diameter of 15 μm or more and 30 μm or less.

Specifically, use of the activated carbon having D50 of 30 μm or more and 110 μm or less and D90 of 110 μm or more as activated carbon as a raw material leads to an increase in the pore volume of the adsorption filter at the pore diameter of 15 μm or more and 30 μm or less. This results in allowing the adsorption filter to have the excellent water permeability with less clogging attributed to a turbid substance, and to be favorably available for a long time. A backwash work further enables the adsorption filter to efficiently restore a flow rate and allows the adsorption filter to have a much longer life.

In the activated carbon as a raw material, D50 is preferably 33 μm or more, more preferably 40 μm or more, still more preferably 44 μm or more, and particularly preferably 50 μm or more. In the activated carbon as a raw material, D50 is preferably 108 μm or less, more preferably 100 μm or less, still more preferably 92 μm or less, and particularly preferably 85 μm or less.

In the activated carbon as a raw material, D90 is preferably 120 μm or more, more preferably 130 μm or more, still more preferably 140 μm or more, and particularly preferably 150 μm or more. An upper limit of D90 is not particularly limited, but may be, for example, 300 μm or less.

If the particle content rate is 1.2 volume % or more at a particle diameter of 10 μm or less in the activated carbon as a raw material, the adsorption filter can obtain the great ultrafine particle removal performance. If the particle content rate is 8.9 volume % or less at the particle diameter of 10 μm or less in the activated carbon as a raw material, it allows the adsorption filter to have the excellent water permeability with low water flow resistance.

In the activated carbon as a raw material, the particle content rate at the particle diameter of 10 μm or less is preferably 2.7 volume % or more, more preferably 2.9 volume % or more, still more preferably 3.1 volume % or more, and particularly preferably 3.2 volume % or more. In the activated carbon as a raw material, the particle content rate at the particle diameter of 10 μm or less is preferably 8.0 volume % or less, more preferably 7.4 volume % or less, still more preferably 6.8 volume % or less, and particularly preferably 6.3 volume % or less.

Kinds of activated carbon as a raw material is not particularly limited as long as the conditions of D50, D90, and the particle content rate at the particle diameter of 10 m or less are satisfied. One kind of activated carbon may be used alone, or two or more kinds of activated carbon having different physical properties may be used in combination. In use of two or more kinds of activated carbon in combination, the particle content rate at the particle diameter of 10 μm or less changes depending on physical properties of each kind of activated carbon and a mixing ratio of the activated carbon. A value of the particle content rate is regulatable by appropriately selecting and/adjusting the physical property of each activated carbon and the mixing ratio.

In the description, the value of the particle content rate of each of D50, D90, and the particle diameter of 10 m or less in the activated carbon as a raw material is regulatable by appropriately selecting and/or adjusting, for example, a kind of a carbonaceous material to be activated carbon as a raw material and to be described later, and a way of activating the carbonaceous material in producing the activated carbon and processing conditions of the way including a heating temperature and a time, a pulverization condition, and a classification condition. Further, the particle content rate of each of D50, D90, and the particle diameter of 10 μm or less in the activated carbon as a raw material is measurable and analyzable by a laser diffraction and scattering method with, for example, a wet particle size distribution measurement device ("Microtrac MT-3300EX II", manufactured by MicrotracBEL Corp.).

Any commercially available activated carbon is adoptable for the activated carbon as a raw material. Alternatively, for example, activated carbon resulting from a carbonaceous material having been subjected to: carbonization treatment, if necessary; thereafter, activation treatment; and washing treatment, drying treatment, and pulverization treatment, if necessary, to be the activated carbon as a raw material.

The carbonaceous material to be a raw material is not particularly limited. Examples of the carbonaceous material include plant-based carbonaceous materials (e.g., materials derived from plants, such as wood, sawdust, charcoal, fruit shell such as coconut shell or walnut shell, fruit seed, by-product of pulp production, lignin, and waste molasses), mineral-based carbonaceous materials (e.g., materials derived from minerals, such as peat, lignite, brown coal, bituminous coal, anthracite coal, coke, coal tar, coal tar pitch, petroleum distillation residue, and petroleum pitch), synthetic resin-based carbonaceous materials (e.g., materials derived from synthetic resins, such as a phenolic resin, polyvinylidene chloride, and an acrylic resin), and natural fibrous carbonaceous materials (e.g., materials derived from natural fibers, such as natural fiber like cellulose, and regenerated fiber like rayon). These carbonaceous materials may be used alone or in combination of two or more kinds thereof.

Among these carbonaceous materials, coconut shell or a phenolic resin is preferable from the viewpoint that such a material easily forms micropores which are involved in the removal performance on volatile organic compounds defined in JIS S 3201 (2019).

When the carbonization treatment is required, each of the carbonaceous materials is carbonized typically under an environment excluding oxygen or air, for example, at a temperature of about 400° C. to 800° C., preferably about 500° C. to 800° C., and more preferably about 550° C. to 750° C. Thereafter, a particle size may be adjusted, if necessary.

Subsequently, the carbonaceous material is activated. The activation treatment includes forming pores on a surface of the carbonaceous material to change the material to activated carbon which is a porous material. Any typical way in the technical field is employable for the activation treatment without particular limitation. Mainly, two kinds of ways, i.e., a gas activation treatment and a chemical activation treatment, can be exemplified. The gas activation treatment is more preferable of these ways for purification of water from the viewpoint of a less remaining amount of impurities.

The gas activation treatment is a treatment of heating a carbonaceous material in the presence of, for example, water vapor, carbon dioxide gas, air, oxide, combustion gas, or mixed gas thereof. A heating temperature is not particularly limited, but the temperature is, for example, about 700° C. to 1100° C., preferably about 800° C. to 980° C., and more preferably about 850° C. to 950° C. An activation time and a temperature-raising speed are not particularly limited and may be appropriately adjusted or regulated depending on the kind, the shape, and the size of the carbonaceous material to be selected. In consideration of safety and reactivity, water-vapor-containing gas containing water vapor of 10 volume % to 40 volume % is preferable. The chemical activation treatment may be a known way of mixing, for example, an activator, such as zinc chloride, calcium chloride, phosphoric acid, sulfuric acid, sodium hydroxide, potassium hydroxide, magnesium hydroxide, calcium hydroxide, with a carbonaceous material, and heating the mixture in an inert gas atmosphere.

The activated carbon having undergone the activation treatment is washed and dried, if necessary. Specifically, in a case where a plant-based carbonaceous material, such as a coconut shell containing impurities like an alkali metal, an alkaline earth metal, and a transition metal, or a mineral-based carbonaceous material is used as a raw material for activated carbon, the material is washed, if necessary, to remove an ash component, a chemical agent, and other materials. Mineral acid and water are used for the washing treatment, and hydrochloric acid having high washing treatment efficiency is preferable as the mineral acid.

The activated carbon having undergone the activation treatment is subjected to pulverization treatment and/or classification treatment, if necessary. The pulverization treatment can be performed with a pulverizing device generally used for pulverizing activated carbon, for example: a high-speed rotary mill, such as an aerofall mill, a rod mill, a roller mill, a hammer mill, a blade mill, and a pin mill; a ball mill; and a jet mill. The classification treatment is performed by a way of generally classifying activated carbon, for example: classification using a sieve; wet classification; and dry classification. Examples of a wet classifier include classifiers that utilize the principle of gravitational classification, inertial classification, hydraulic classification, centrifugal classification, and other classification. Examples of a dry classifier include classifiers that utilize the principle of sedimentation classification, mechanical classification, centrifugal classification, and other classification.

The activated carbon after these treatments or a commercially available activated carbon may have any shape, such as a powdery shape, a particulate shape, and a fibrous shape like a thread-like shape, a woven fabric or cloth shape, or felt shape. Each shape is appropriately selectable depending on a purpose. The powdery shape with a high adsorption performance per volume is preferable among these shapes.

(Binder)

A binder for the adsorption filter in the embodiment is not particularly limited. A powdery binder or a fibrous binder may be used alone, or may be used in combination of two or more kinds of the binders. Of the kinds of binders, a fibrous binder is preferable from the viewpoint of the excellent water permeability in molding of the adsorption filter.

The fibrous binder is not particularly limited as long as the activated carbon can be entangled and shaped, so that a wide variety of binders including synthetic binders and natural binders can be used. Examples of such a binder include acrylic fibers, polyethylene fibers, polypropylene fibers, polyacrylonitrile fibers, cellulose fibers, nylon fibers, aramid fibers, and pulp. The fibrous binder preferably has a fiber length of 4 mm or less.

The fibrous binder preferably includes an acrylic fibrous binder. The fibrous binder more preferably includes a cellulose fibrous binder. The fibrous binders may be used in combination of two or more kinds. For example, the acrylic fibrous binder and the cellulose fibrous binder may be further preferably used in combination. Such combination with the cellulose fibrous binder can reduce an outflow of fine powder from the adsorption filter in the embodiment. A mixing ratio of the cellulose fibrous binder to the acrylic fibrous binder is defined such that the cellulose fibrous binder is blended at preferably 30 parts by mass to 70 parts by mass, and more preferably 40 parts by mass to 60 parts by mass, based on 100 parts by mass of the acryl fibrous binder.

In the embodiment, the water permeability of the fibrous binder is preferably about 1 mL to 200 mL in terms of a CSF value. The CSF value is more preferably 10 mL to 150 mL. Here, in the description, the CSF value is a value obtained through measurement in accordance with JIS P8121 (2012) "Pulps-Determination of Drainability" Canadian Standard Freeness Method. Specifically, the CSF value is evaluated with tap water having conductivity of about 100 µs/cm in the measurement. The CSF value is adjustable, for example, by fibrillating the binder.

If the CSF value of the fibrous binder is 1 mL or more, it leads to achievement in a sufficiently maintained water permeability, suppression of a reduction in the strength of the molded body, and prevention of a pressure loss. If the CSF value is 200 mL or less, it leads to achievement in reliable holding of the powdered activated carbon, suppression of a reduction in the strength of the molded body, and prevention of a decrease in the adsorption performance. In use of two or more kinds of fibrous binders in combination, a CSF value preferably satisfies the aforementioned range in a state where the two or more kinds of fibrous binder are blended.

Specifically, when the fibrous binder includes the acrylic fibrous binder, the CSF value of the acrylic fibrous binder is preferably 20 mL or more, and more preferably 50 mL or more. The CSF value of the acrylic fibrous binder is preferably 200 mL or less, and more preferably 150 mL or less. If the CSF value of the acrylic fibrous binder falls within such a range, it allows even a fibrous binder including another fibrous binder in addition to the acrylic fibrous binder to have an appropriate CSF value as a whole of the fibrous binder including the acrylic fibrous binder. This consequently achieves improvement in the strength of the molded body, a decrease in a pressure loss, the holding of the powdered activated carbon and maintaining of adsorption performance of the powdered activated carbon. From a similar viewpoint, in a case where a fibrous binder includes an acrylic fibrous binder and a cellulose fibrous binder, the cellulose fibrous binder preferably has a CSF value of 1 mL or more, and more preferably has a CSF value of 10 mL or more in a state where the cellulose fibrous binder is blended at 50 parts by mass based on 100 parts by mass of the acrylic fibrous binder. Besides, the cellulose fibrous binder preferably has a CSF value of 50 mL or less, and more preferably has a CSF value of 40 mL or less in a state where the cellulose fibrous binder is blended at 50 parts by mass based on 100 parts by mass of the acrylic fibrous binder.

A mixing ratio between the activated carbon and the binder is not particularly limited. The mixing ratio may be appropriately set in such a manner that a pore volume at the pore diameter of 15 µm or more and 30 µm or less (and, preferably a pore volume at the pore diameter of 7 µm or less) falls within a specific range defined in the embodiment in molding the adsorption filter. For instance, an amount of the binder is preferably about 2 parts by mass to 8 parts by mass based on 100 parts by mass of the activated carbon from the perspectives of the adsorption performance of the activated carbon and the moldability of the adsorption filter. If the amount of the binder is 2 parts by mass or more, it allows the molded body of the adsorption filter to have a sufficiently high strength. If the amount of the binder is 8 parts by mass or less, it is possible to prevent the adsorption performance of the activated carbon in the adsorption filter from decreasing.

The mixing ratio of the binder to 100 parts by mass of the activated carbon is more preferably 3 parts by mass or more, and more preferably 4 parts by mass or more. The mixing ratio of the binder to 100 parts by mass of the activated carbon is more preferably 7 parts by mass or less, and still more preferably 6 parts by mass or less. In a case where a lead adsorbent and the like to be described later are contained, a mixing ratio of the binder to the total of the activated carbon and the lead adsorbent and the like is preferably the aforementioned mixing ratio.

(Optional Component)

The adsorption filter in the embodiment may contain other optional and functional component as long as the effects of the present invention are not inhibited. For instance, zeolite powder capable of removing soluble lead by adsorption (lead adsorbent), an ion-exchange resin, a chelate resin and the like are exemplified. Moreover, various kinds of adsorbents containing a silver ion or a silver compound for imparting an antimicrobial property may be added alone or in combination of two or more kinds. Examples of the adsorbent include silver-added activated carbon to be added in an amount having no adverse influence on the physical properties of the adsorption filter in the embodiment. A mixing amount of the optional component is not particularly limited and is appropriately set so that the pore volume at the pore diameter of 15 μm or more and 30 μm or less (and preferably the pore volume at the pore diameter of 7 μm or less) falls within a specific range defined in the embodiment in molding the adsorption filter. For instance, such an optional component may be blended at 1 part by mass to 30 parts by mass based on 100 parts by mass of the entire adsorption filter.

The adsorption filter including the molded body comprising the activated carbon and the binder in the embodiment may be a cylindrical adsorption filter having a core. The cylindrical shape attains lower water flow resistance. The filter is further advantageous, when being accommodated in a housing and used as a cartridge, in that the cartridge is easily mountable to a water purifier and is easily replaceable.

The core is not particularly limited as long as the core is insertable in a hollow of the cylindrical adsorption filter to reinforce the cylindrical adsorption filter. Examples of the core include a trical pipe, a netron pipe, a ceramic filter and the like. The core may be used with a non-woven fabric or other fabric wound around the outer periphery thereof.

[Method for Producing an Adsorption Filter]

Any method known to a person skilled in the art is adoptable for producing an adsorption filter in the embodiment without particular limitation. A slurry suction method is preferable from the viewpoint of its high production efficiency.

Hereinafter, an example method for producing a cylindrical adsorption filter in the embodiment will be described in detail. However, the present invention is not limited thereto.

Specifically, for example, a cylindrical adsorption filter (molded body) in the embodiment can be produced by a method including: a slurry preparation step; a suction filtration step; a rolling step, if necessary; a drying step; and a grinding step, if necessary. In the slurry preparation step, slurry is prepared by dispersing powdered activated carbon and a fibrous binder in water. In the suction filtration step, the prepared slurry is suctioned and filtered to make a premolded body. In the rolling step, a shape of an outer surface of the premolded body having been subjected to the suction and filtration is adjusted by compressing the premolded body on a shaping bench, if necessary. In the drying step, the shaped premolded body is dried to make a dried molded body. In the grinding step, an outer surface of the dried molded body is ground, if necessary. Hereinafter, each of the steps will be described in more detail.

(Slurry Preparation Step)

In the slurry preparation step, slurry in which powdered activated carbon and a fibrous binder are dispersed in a solvent is prepared so that the slurry contains 2 parts by mass to 8 parts by mass of the fibrous binder based on 100 parts by mass of the powdered activated carbon and has a solid content concentration of 0.1% by mass to 10% by mass, and preferably 1% by mass to 5% by mass. The solvent is not particularly limited, but water or other liquid is preferably used. Adjustment of the solid content concentration of slurry to a not excessively high value leads to achievement in easier uniform dispersion and prevention of mottles coming into existence in a molded body. In contrast, adjustment of the solid content concentration of slurry to a not excessively low value leads to achievement in saving of a molding time and improved productivity. Further, the molded body is prevented from having an excessively high density, and thus can keep a favorable water permeability.

(Suction Filtration Step)

The suction filtration step will be described with reference to FIG. 1. Reference numerals shown in FIG. 1 denote a mold 1, a core body 2, suction holes 3, flanges 4, 4', and a filtrate discharge port 5. In the suction filtration step, for example, the mold 1 for a cylindrical molded body is used. As illustrated in FIG. 1, for example, the mold 1 includes: the core body 2 having a surface with a plurality of suction holes 3; the flanges 4, 4' at the opposite ends; and the filtrate discharge port 5. First, the core as described above is attached to the mold 1, and the resultant mold is put in the prepared slurry. Then, filtering the slurry from the inside of the mold 1 via the filtrate discharge port 5 while suctioning the slurry allows the slurry to be adhered to the mold 1. Employable suction methods include a conventional method, for example, a suction method using a suction pump, or other method. Consequently, the premolded body is adhered to the mold 1.

(Rolling Step)

The rolling step may be performed after the suction filtration step if necessary to adjust an outer diameter of the premolded body to a predetermined value, increase the roundness, and reduce irregularities on an outer peripheral surface. In the rolling step, the mold 1 is placed on a bench in a state where the premolded body made in the suction step is adhered, and may be moved back and forth with a predetermined pressing force.

The suction filtration step and the rolling step to be performed if necessary may be performed an appropriate number of times to attain a desired pore volume, a desired adsorption filter density and the like.

(Drying Step)

Figure 2:
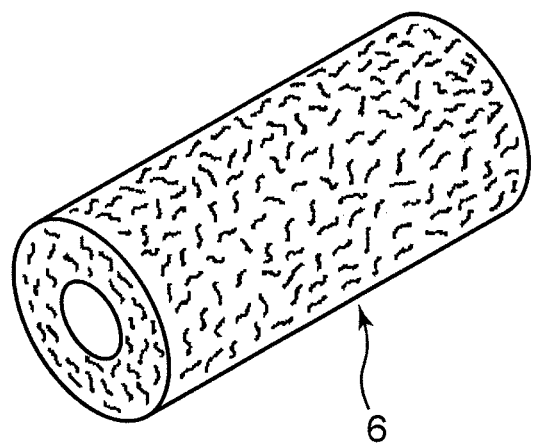
FIG. 2 is a perspective view of an example adsorption filter in the embodiment, the filter having been prepared by using the mold illustrated in FIG. 1.

Subsequently, the flanges 4, 4' at the opposite ends of the mold 1 are removed, and the core body 2 is removed. In this manner, a hollow cylindrical premolded body is obtainable. In the drying step, the premolded body removed from the mold 1 is dried by a dryer or other drying device to make a molded body 6 (corresponding to the adsorption filter in the embodiment) illustrated in FIG. 2.

The drying temperature is, for example, about 100° C. to 150° C., particularly about 110° C. to 130° C. The drying time is, for example, about 4 to 24 hours, particularly about 8 to 16 hours. Setting the drying temperature to a not excessively high temperature leads to achievement in a lower likelihood of a decrease in the filtration performance attributed to quality deterioration or melting of the fibrous binder, or in a lower likelihood of a reduction in the strength of the molded body. Setting the drying temperature to a not excessively low temperature leads to achievement in saving of a drying time and prevention of unsatisfactory drying.

(Grinding Step)

A grinding step may be performed after the drying step if necessary to further adjust the outer diameter of the adsorption filter or to reduce the irregularities on the outer peripheral surface. The grinding way is not particularly limited as long as the outer surface of the dried molded body can be ground or polished. Thus, any way known to a person skilled in the art may be used for griding. From the viewpoint of uniform grinding, a way using a grinder that grinds the molded body while rotating the molded body is preferable.

The grinding step is not limited to the way using a grinder. For example, the molded body fixed to a rotary shaft may be ground with a fixed plate-shaped grindstone. In this way, the generated grinding shavings have a tendency to accumulate on the ground surface. The grinding with air blowing is thus effective to avoid the accumulation.

[Purposes and Applications of the Adsorption Filter]

The adsorption filter in the embodiment is applicable to, for example, a water purification filter, an artificial dialysis filter and the like. For instance, if it is used as the water purification water filter or the artificial dialysis filter, an adsorption filter produced through shaping and drying by the method described above is thereafter cut into a desired size and a desired shape. Furthermore, if necessary, a cap may be put on a tip portion of the filter, or a non-woven fabric may be laid over a surface of the filter.

The adsorption filter in the embodiment is applicable to a water purification cartridge by filling a housing with the filter. The water purification cartridge is mounted in a water purifier to enable water to pass therethrough. As a water-passing way, a total filtration way of filtrating a whole amount of raw water or a circulation filtration way is employable. The water purification cartridge to be mounted in the water purifier may be used, for example, with a water purification filter (the adsorption filter in the embodiment) accommodated in the housing. Alternatively, the water purification filter is further adoptable in combination with a known non-woven fabric filter, various kinds of adsorbents, mineral additives, ceramic filtering materials, and other materials.

Heretofore, the gist of the present invention is described, and the adsorption filter in the embodiment will be summarized below.

An adsorption filter according to a first aspect of the present invention is an adsorption filter, comprising:
a molded body containing activated carbon and a binder, wherein
a pore volume of the adsorption filter at a pore diameter of 15 μm or more and 30 μm or less at a volume basis of the adsorption filter under measurement by mercury intrusion porosimetry is 0.06 cm$^3$/cc to 0.30 cm$^3$/cc.

Alternatively, an adsorption filter according to a second aspect of the present invention is an adsorption filter, comprising:
a molded body containing activated carbon and a binder, wherein
D50 is 30 μm or more and 110 μm or less and D90 is 110 μm or more in a cumulative particle size distribution at a volume basis of the activated carbon, and
a particle content rate of the activated carbon at a particle diameter of 10 μm or less is 1.2 volume % or more and 8.9 volume % or less.

In the adsorption filter according to the first or the second aspect, preferably, a pore volume of the adsorption filter at a pore diameter of 7 μm or less at a volume basis of the adsorption filter under measurement by mercury intrusion porosimetry is 0.10 cm$^3$/cc or more.

In the adsorption filter according to the first aspect, preferably, D50 is 30 μm or more and 110 μm or less and D90 is 110 μm or more in a cumulative particle size distribution at a volume basis of the activated carbon, and
a particle content rate of the activated carbon at a particle diameter of 10 μm or less is 1.2 volume % or more and 8.9 volume % or less.

EXAMPLES

Hereinafter, the present invention will be described in more details with reference to Examples, but the present invention is not limited to Examples.

First of all, raw materials used in Examples and Comparative Examples, and ways of measuring physical properties of powdered activated carbon as raw materials, ways of measuring physical properties of produced adsorption filters, and evaluation ways in these examples will be described in detail.

[Raw Material for an Adsorption Filter]

Hereinafter, a method of producing activated carbon or powdered activated carbon to be a raw material will be described. However, such a production method is not particularly limited as long as necessary physical properties are satisfied.

Powdery Activated Carbon A

Coconut shell carbon obtained by carbonizing Philippine coconut shell was activated by water vapor at 900° C., and the obtained coconut shell activated carbon was washed with diluted hydrochloric acid and demineralized with ion-exchanged water, to obtain granular activated carbon. The obtained granular activated carbon was pulverized with a ball mill to obtain powdered activated carbon A having D10 of 15 μm, D50 of 85 μm, and D90 of 159 μm.

Powdery Activated Carbon B

Granular activated carbon was obtained in the same manner as the powdered activated carbon A, and the obtained granular activated carbon was pulverized with the ball mill to obtain powdered activated carbon B having D10 of 14 μm, D50 of 60 μm, and D90 of 152 μm.

Powdery Activated Carbon C

Granular activated carbon was obtained in the same manner as the powdered activated carbon A, and the obtained granular activated carbon was pulverized with the ball mill to obtain powdered activated carbon C having D10 of 18 μm, D50 of 55 μm, and D90 of 152 μm.

Powdery Activated Carbon D

Granular activated carbon was obtained in the same manner as the powdered activated carbon A, and the obtained granular activated carbon was pulverized with the ball mill to obtain powdered activated carbon D having D10 of 15 μm, D50 of 86 μm, and D90 of 164 μm.

Powdery Activated Carbon E

Granular activated carbon was obtained in the same manner as the powdered activated carbon A, and the obtained granular activated carbon was pulverized with the ball mill to obtain powdered activated carbon E having D10 of 18 μm, D50 of 45 μm, and D90 of 130 μm.

Powdery Activated Carbon F

Granular activated carbon was obtained in the same manner as the powdered activated carbon A, and the obtained granular activated carbon was pulverized with the ball mill to obtain powdered activated carbon F having D10 of 18 μm, D50 of 44 μm, and D90 of 120 μm.

Powdery Activated Carbon G

Granular activated carbon was obtained in the same manner as the powdered activated carbon A, and the obtained granular activated carbon was pulverized with the ball mill to obtain powdered activated carbon G having D10 of 16 μm, D50 of 32 μm, and D90 of 58 μm.
Powdery Activated Carbon H Granular activated carbon was obtained in the same manner as the powdered activated carbon A, and the obtained granular activated carbon was pulverized with the ball mill to obtain powdered activated carbon H having D10 of 13 μm, D50 of 108 μm, and D90 of 194 μm.
Powdery Activated Carbon I Granular activated carbon was obtained in the same manner as the powdered activated carbon A, and the obtained granular activated carbon was pulverized with a roll mill to obtain powdered activated carbon I having D10 of 72 μm, D50 of 138 μm, and D90 of 215 μm.
Powdery Activated Carbon J Granular activated carbon was obtained in the same manner as the powdered activated carbon A, and the obtained granular activated carbon was pulverized with the ball mill, and thereafter, the pulverized activated carbon was subjected to dry classification. Finally, powdered activated carbon J having D10 of 24 μm, D50 of 58 μm, and D90 of 149 μm was obtained.
Powdery Activated Carbon K Granular activated carbon was obtained in the same manner as the powdered activated carbon A, and the obtained granular activated carbon was pulverized with the ball mill to obtain powdered activated carbon K having D10 of 10 μm, D50 of 32 μm, and D90 of 66 μm.

The physical properties of each of the powdered activated carbon A to the powdered activated carbon K are collectively shown together with physical properties of an adsorption filter and evaluation results thereof in Table 3 and Table 4 below.
(Binders)

Acrylic fibrous binder: "acrylic fiber Bi-PUL/F" produced by Japan Exlan Co., Ltd, a CSF value of 83 ml.

Cellulose fibrous binder having a CSF value of 28 mL in a state where the cellulose fibrous binder is blended at 50 parts by mass based on 100 parts by mass of the above acrylic fibrous binder having a CSF value of 83 mL.
(Others)

Titanosilicate lead adsorbent: "ATS" produced by Solenis, an average particle diameter of 20 μm.

Core: "PMF-30C-12-14" produced by Daiwabo Progress Co., Ltd.

Non-woven fabric: "9540-F" produced by SHINWA Co., Ltd.
[Measurement of a Particle Size Distribution of Activated Carbon as a Raw Material]

D10 (μm), D50 (μm), and D90 (μm), and a particle content rate (volume %) at a particle diameter of 10 μm or less in activated carbon as a raw material were measured by a laser diffraction-scattering way. Specifically, the activated carbon to be measured was put in ion-exchanged water together with a surfactant and subjected to ultrasonic vibration to prepare a homogeneous dispersion. And then, using the prepared homogeneous dispersion, the particle size distribution was measured with a wet particle size distribution measurement device "Microtrac MT-3300EX II" manufactured by MicrotracBEL Corp. As the surfactant, "Polyoxyethylene (10) octylphenyl ether" produced by FUJIFILM Wako Pure Chemical Corporation was used.

Analysis conditions are shown below.
(Analysis Conditions)
Number of measurements; average value of three measurements
Measurement time; 30 seconds
Distribution representation; volume
Particle size division; standard
Calculation mode; MT3000 II
Solvent name; WATER
Measurement upper limit; 2000 μm, measurement lower limit; 0.021 μm
Residual fraction ratio; 0.00
Passing fraction ratio; 0.00
Residual fraction ratio setting; invalid
Particle transmittance; suction
Particle refractive index; N/A
Particle shape; N/A
Solvent refractive index; 1.333
DV value; 0.0882
Transmittance (TR); 0.880 to 0.900
Extension filter; invalid
Flow rate; 70%
Ultrasonic output; 40 W
Ultrasonic time; 180 seconds
[Measurement of an Adsorption Filter Density]

An adsorption filter density (g/cm$^3$) was calculated with the following equation after drying the obtained adsorption filter at 120° C. for two hours. The adsorption filter density refers to a density of only a molded layer of the activated carbon.

Adsorption filter density=(Mass of molded layer of activated carbon of adsorption filter)/(Volume of molded layer of activated carbon of adsorption filter)

[Measurement of a Pore Volume of an Adsorption Filter with a Mercury Porosimeter]

Figure 3:
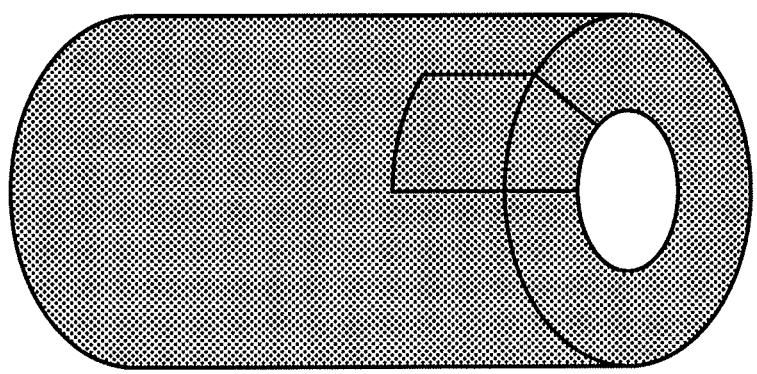
FIG. 3 is an illustration explaining a way of cutting off a sample from the adsorption filter for measurement of a pore volume of the adsorption filter.
Figure 3:
Figure 3:
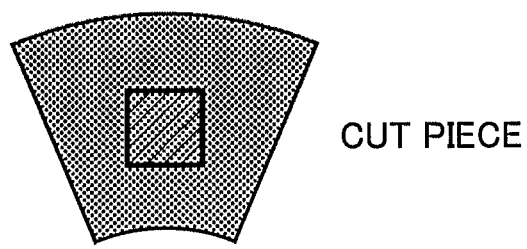
Figure 3:
Figure 3:
Figure 3:

The pore volume of the adsorption filter was measured with a mercury intrusion porosimetry pore volume measurement device "MicroActive AutoPore V 9620" manufactured by Micromeritics Instrument Corporation. The measurement pressure was defined to be 0.7 kPa to 420 MPa. The molded layer composed of the activated carbon and the binder of the cylindrical adsorption filter was cut as illustrated in FIG. 3, and thereafter, the cut piece was further cut into a size of about 1 cm square. Concerning a sample resulting from the cut piece having the size of about 1 cm square, a pore volume (cm$^3$/g) at a pore diameter of 15 μm or more and 30 μm or less, a pore volume (cm$^3$/g) at a pore diameter of 7 μm or less, and a total pore volume (cm$^3$/g) of the adsorption filter at a weight basis of the adsorption filter were calculated. The calculated values are multiplied by the adsorption filter density obtained above to calculate a pore volume (cm$^3$/cc) at the pore diameter of 15 m or more and 30 μm or less, a pore volume (cm$^3$/cc) at the pore diameter of 7 μm or less, and a total pore volume (cm$^3$/cc) of the adsorption filter at a volume basis of the adsorption filter were calculated.
[Evaluation of Filterability on a Turbid Substance]

A water-passing test based on test water containing a turbid substance was conducted to calculate a turbidity removal rate life (L/cc) and a turbidity clogging life (L/cc) and evaluate the filterability of the adsorption filter on the turbid substance. The following way was employed for measurement and calculation of the lives.

First, dilute water containing kaolin (produced by NACALAI TESQUE, INC.) having a particle diameter of 0.1 μm to 4 μm as a turbid substance at two degrees of turbidity was prepared. The temperature of the prepared dilute water was adjusted to a temperature of 20° C.±3° C., and the adjusted dilute water was used as test water. The test water was made pass through the obtained cylindrical adsorption filter from the outside to the inside thereof while keeping the hydrodynamic pressure at 0.1 MPa to measure a flow rate over time. At the same time, the test water and treated water were collected to respectively serve as samples. The turbidity in each of the samples at a wavelength of 660 nm was measured in a cylindrical quarts cell having a size of 50 mm with a spectrophotometer "UV-1900" manufactured by SHIMADZU Corporation. From a result of the measurement, a removal rate (%) for treatment of turbidness in the test water was measured. Furthermore, a cumulative water-passing amount for a volume of the adsorption filter at a time when the turbidness removal rate fell below 80% was calculated as the turbidness removal rate life (L/cc). In this test, a turbidness removal rate life (L/cc) of 10.5 L/cc or more was defined as an acceptability criterion, and the adsorption filter was evaluated to enable favorable removal of the turbid substance for a long time.

Besides, a cumulative water-passing amount for the volume of the adsorption filter at a time when the flow rate fell below ½ from ten minutes after the start of the water-passing was calculated as the turbidness clogging life (L/cc). In this test, a turbidness clogging life (L/cc) of 10.5 L/cc or more was defined as an acceptability criterion, and the adsorption filter was evaluated to attain an excellent water permeability for a long time without clogging of the turbid substance.

[Evaluation of Filterability on a Turbid Substance in Performing a Backwash Work]

The following way was employed to evaluate filterability of an adsorption filter on a turbid substance in performing a backwash work. A water-passing test based on test water containing a turbid substance while performing a backwash work was conducted to calculate a turbidness removal rate life (L/cc) and a turbidness clogging life (L/cc) in performing a backwash work. The following way was employed for measurement and calculation of the lives.

A backwash work was performed once every time after five-hour water-passing from the start of the water-passing. Specifically, a backwash work was performed to make the water flow in a direction opposite to a flow direction for one minute, that is, make the water pass through the adsorption filter from the inside to the outside thereof, while keeping the hydrodynamic pressure at 0.1 MPa. After a lapse of one minute, the water was restored to flow in the original flow direction, that is, made pass through the adsorption filter from the outside to the inside thereof, while the hydrodynamic pressure was kept at 0.1 MPa. Other procedures, a measurement way, and a calculation way are the same as those for the above-described turbidness removal rate life (L/cc) and the turbidness clogging life (L/cc).

In this test, a turbidness removal rate life (L/cc) of 15.1 L/cc or more in performing a backwash work was defined as an acceptability criterion, and the adsorption filter was evaluated to enable favorable removal of the turbid substance for a long time in combination with the backwash work. Besides, a turbidness clogging life (L/cc) of 15.1 L/cc or more in performing a backwash work was defined as an acceptability criterion, and the adsorption filter was evaluated to attain an excellent water permeability for a long time in combination with a backwash work while avoiding clogging with the turbid substance.

[Measurement of an Ultrafine Particle Removal Performance]

The following way was employed to measure an ultrafine particle removal performance of an adsorption filter. Dilute water that contains fluorescent particles "Fluoro-Max (Trademark) Green Fluorescent Polymer Microspheres G500" produced by Thermo Fisher Scientific Inc. and having a particle diameter of 0.5 μm at a density of 10000/ml or more was prepared. The temperature of the dilute water was adjusted to 20° C.±3° C., and the adjusted dilute water was used as test water. The test water was made pass through the cylindrical adsorption filter from the outside to the inside thereof at a flow rate of 1.9 L/min. to simultaneously collect the test water and treated water to respectively serve as samples over time. The samples were filtered with a membrane filter having the size of 0.2 μm ("MEMBRANE FILTER A020B025A WHITE" produced by Advantec Co., Ltd., cellulose mixed ester, 0.2 μm, 25 mm, with black lines), and the membrane filter was dried at 60° C. The dried membrane filter was fixed onto a microscope slide and observed with a fluorescent microscope ("BX51-34-FL" manufactured by OLYMPUS CORPORATION) to calculate the number of fluorescent particles in both the samples and calculate a removal rate (%) of the particles contained in the test water through treatment. The cumulative water-passing amount for a volume of the adsorption filter at a time when a particle removal rate fell below 85% was calculated as an ultrafine particle removal rate life (L/cc). In this test, an ultrafine particle removal rate life (L/cc) of 10.5 L/cc or more was defined as an acceptability criterion, and the adsorption filter was evaluated to enable favorable removal of an ultrafine particle for a long time.

[Measurement of Initial Water Flow Resistance]

Water at the temperature of 20° C.±3° C. was made pass through a cylindrical adsorption filter from the outside to the inside thereof at a flow rate of 1.9 L/min., and water flow resistance (MPa) after ten minutes from the start of the water-passing was measured as initial water flow resistance. A value of the water flow resistance was calculated by subtracting resistance related to a housing.

[Measurement of a VOC Removal Performance]

The following way was employed to measure a VOC removal performance of an adsorption filter. Dilute water containing chloroform at a concentration of 60 ppb±12 ppb was prepared. The temperature of the prepared dilute water was adjusted to 20° C.±3° C., and the adjusted dilute water used as test water. The test water was made pass through the cylindrical adsorption filter from the outside to the inside thereof at a flow rate of 1.9 L/min. to simultaneously collect the test water and treated water to respectively serve as samples over time. The concentration of chloroform in each of the samples was measured with an ECD gas chromatograph ("GC-2014" manufactured by SHIMADZU Corporation) to calculate a removal rate (%). A cumulative water-passing amount for a volume of the adsorption filter at a time when the chloroform removal rate fell below 80% was calculated as a VOD removal rate life (L/cc). In this test, a VOC removal rate life (L/cc) of 10.5 L/cc or more was defined as an acceptability criterion, and the adsorption filter was evaluated to enable favorable removal of the VOC for a long time.

[Measurement of a Lead Removal Performance]

The following way was employed to measure a lead removal performance of an adsorption filter. Dilute water containing lead at a concentration of 150 ppb±15 ppb was prepared, and the prepared dilute water was adjusted to have pH of 8.30 to 8.60 in a sodium hydroxide solution. The temperature of the dilute water was adjusted to 20° C.±3° C., and the adjusted dilute water was used as test water. The test water was made pass through the cylindrical adsorption filter from the outside to the inside thereof at a flow rate of 1.9

L/min. to simultaneously collect the test water and treated water to respectively serve as samples over time. The concentration of lead in each of the samples was measured with an ICP emission spectrometer ("ICPE 9820" manufactured by SHIMADZU Corporation) in combination with an ultrasonic nebulizer ("UAG-1" manufactured by SHIMADZU Corporation). A cumulative water-passing amount for a volume of the adsorption filter at a time when the concentration of lead in the treated water reached 10 ppb or more was calculated as a lead removal rate life (L/cc). In this test, a lead removal rate life (L/cc) of 10.5 L/cc or more was defined as an acceptability criterion, and the adsorption filter was evaluated to enable favorable removal of the lead for a long time.

Next, a method for producing an adsorption filter, and a physical property measurement result and a performance evaluation result of the produced adsorption filter, in each Example and each Comparative Example will be described in detail.

Example 1

The powdered activated carbon A, a titanosilicate lead adsorbent, an acrylic fibrous binder, and a cellulose fibrous binder were prepared to have a total of 8.36 kg at a mixing ratio shown in Table 1 below, and tap water was added thereto. An amount of slurry after the addition was set to 83.6 L.

Figure 4:
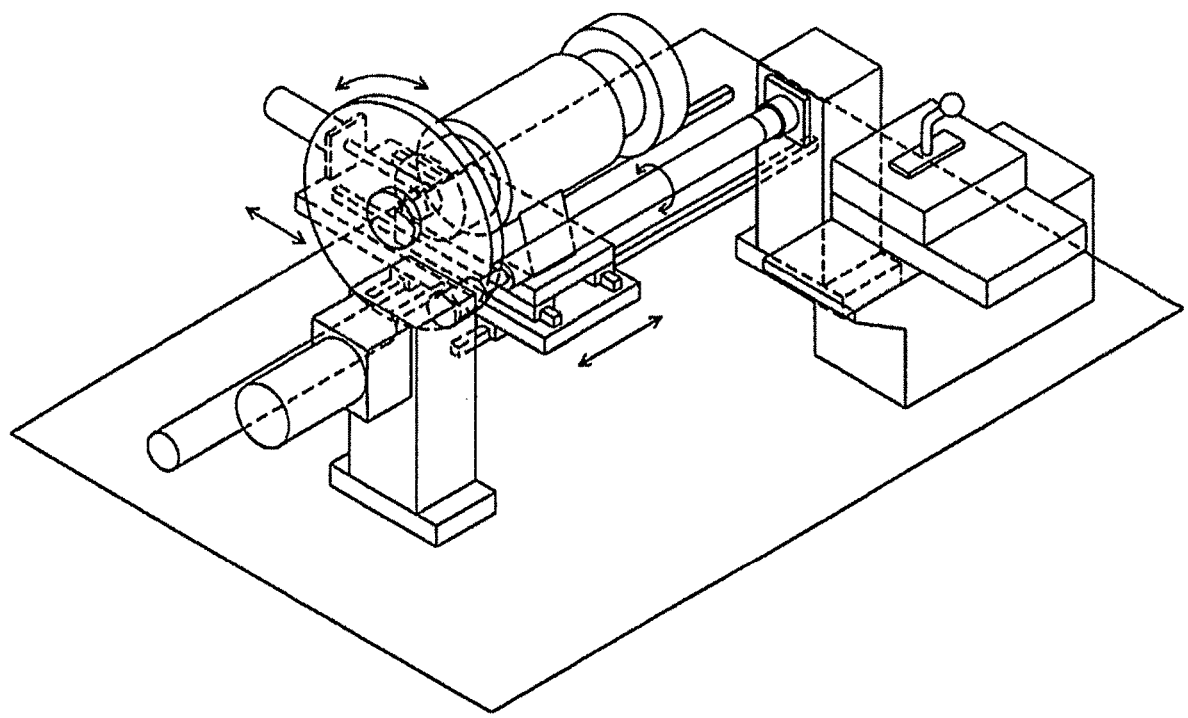
FIG. 4 is a perspective view of an example automatic grinder for producing the adsorption filter.

Subsequently, a core was attached to a cylindrical molding mold having an outer diameter of 40.0 mm, an inner shaft diameter of 11.6 mm, and a distance of 365.0 mm between flanges at an outer diameter as illustrated in FIG. 1. Resultant slurry was suctioned under 400 mmHg until an outer diameter thereof reached 43 mm, which was slightly larger than the outer diameter of the mold, and molded, and thereafter dried. Then, the obtained molded body was mounted on an automatic grinder illustrated in FIG. 4. An outer surface of the obtained molded body was ground at a molded-body rotational speed of about 360 rpm/min., at a grindstone rotational speed of 2535 rpm/min., and at a grindstone moving speed of 250 mm/10 sec., i.e., 2.5 cm/sec., to obtain a cylindrical adsorption filter having an outer diameter of 38.6 mm, an inner diameter of 12 mm, and a height of 108.0 mm.

The above-described way was employed for the adsorption filter obtained in this manner to measure a density of the adsorption filter, and a pore volume of the adsorption filter with a mercury porosimeter. Physical property measurement results of the adsorption filter will be collectively shown in Table 3 below.

Thereafter, a non-woven fabric was wound once on an outer periphery of the obtained adsorption filter. Subsequently, a columnar packing seal made of ABS resin with a thickness of about 1 mm and having an outer diameter of 39 mm was adhered to one end of the adsorption filter with a hot-melt adhesive. Further, another packing seal was adhered to the other end of the adsorption filter with the hot-melt adhesive, the seal having an outer diameter of 39 mm and two holes with a size of 2.2 mm in a center portion thereof and having a threaded portion connectable to a housing for a water-passing test.

The adsorption filter with the non-woven fabric wound thereon and the seals adhered thereto was accommodated in the housing made of ABS resin and having an average diameter of 50 mm, a length of about 117 mm, and an inner capacity of about 230 cm$^3$. The resultant structure was used to make water pass therethrough from the outside to the inside. The above-described way was employed to evaluate: turbidity filterability; turbidity filterability in performing a backwash work; an ultrafine particle removal performance; initial water flow resistance; a VOC removal performance; and a lead removal performance. Relevant performance evaluation results are collectively shown in Table 3 below as well. Table 3 further shows a particle content rate (volume %) of the activated carbon as a raw material at a particle diameter of 10 m or less as measured by the above-described way.

Example 2 to Example 6

As shown in Table 1 below, cylindrical adsorption filters were obtained respectively in Example 2 to Example 6 in the same manner as the filter in Example 1 except that the powdered activated carbon B to the powdered activated carbon F were respectively used as activated carbon as raw materials in place of the powdered activated carbon A. Physical property measurement results and performance evaluation results of the respective adsorption filters in Example 2 to Example 6 are collectively shown in Table 3 below.

Comparative Example 1 to Comparative Example 5

As shown in Table 2 below, cylindrical adsorption filters were obtained respectively in Comparative Example 1 to Comparative Example 5 in the same manner as the filter in Example 1 except that the powdered activated carbon G to the powdered activated carbon K were respectively used as activated carbon as raw materials in place of the powdered activated carbon A. Physical property measurement results and performance evaluation results of the respective adsorption filters in Comparative Example 1 to Comparative Example 5 are collectively shown in Table 4 below.

TABLE 1

| | Mixing Ratio | | | | | | | | |
|---|---|---|---|---|---|---|---|---|---|
| | Powderd activated carbon A Parts by mass | Powderd activated carbon B Parts by mass | Powderd activated carbon C Parts by mass | Powderd activated carbon D Parts by mass | Powderd activated carbon E Parts by mass | Powderd activated carbon F Parts by mass | Titanosilicate lead adsorbent Parts by mass | Acrylic fibrous binder Parts by mass | Cellulose fibrous binder Parts by mass |
| Example 1 | 90 | — | — | — | — | — | 10 | 3 | 1.5 |
| Example 2 | — | 90 | — | — | — | — | 10 | 3 | 1.5 |
| Example 3 | — | — | 90 | — | — | — | 10 | 3 | 1.5 |
| Example 4 | — | — | — | 90 | — | — | 10 | 3 | 1.5 |

TABLE 1-continued

| | \multicolumn{9}{c}{Mixing Ratio} | | | | | | | | |
|---|---|---|---|---|---|---|---|---|---|
| | Powderd activated carbon A Parts by mass | Powderd activated carbon B Parts by mass | Powderd activated carbon C Parts by mass | Powderd activated carbon D Parts by mass | Powderd activated carbon E Parts by mass | Powderd activated carbon F Parts by mass | Titanosilicate lead adsorbent Parts by mass | Acrylic fibrous binder Parts by mass | Cellulose fibrous binder Parts by mass |
| Example 5 | — | — | — | — | 90 | — | 10 | 3 | 1.5 |
| Example 6 | — | — | — | — | — | 90 | 10 | 3 | 1.5 |

TABLE 2

| | Powderd activated carbon G Parts by mass | Powderd activated carbon H Parts by mass | Powderd activated carbon I Parts by mass | Powderd activated carbon J Parts by mass | Powderd activated carbon K Parts by mass | Titanosilicate lead adsorbent Parts by mass | Acrylic fibrous binder Parts by mass | Cellulose fibrous binder Parts by mass |
|---|---|---|---|---|---|---|---|---|
| Comparative Example 1 | 90 | — | — | — | — | 10 | 3 | 1.5 |
| Comparative Example 2 | — | 90 | — | — | — | 10 | 3 | 1.5 |
| Comparative Example 3 | — | — | 90 | — | — | 10 | 3 | 1.5 |
| Comparative Example 4 | — | — | — | 90 | — | 10 | 3 | 1.5 |
| Comparative Example 5 | — | — | — | — | 90 | 10 | 3 | 1.5 |

In Table 1 and Table 2, "-" means no containing. An amount of the acrylic fibrous binder and an amount of the cellulose fibrous binder in each of Table 1 and Table 2 are expressed with parts by mass based on a total of 100 parts by mass of the activated carbon as a raw material and a titanosilicate lead adsorbent.

TABLE 3

| | \multicolumn{4}{c}{Physical properties of activated carbon as raw material} | | \multicolumn{6}{c}{Adsorption filter physical properties — Mercury porosimeter} | | | | | |
|---|---|---|---|---|---|---|---|---|---|---|---|
| | D10 (μm) | D50 (μm) | D90 (μm) | Particle content rate (volme %) at particle diameter of 10 μm or less | Filter density (g/cc) | Total pore volume cm³/g (Filter weight basis) | Total pore volume cm³/cc (Filter volume basis) | Pore volume at pore diameter of 15 μm or more and 30 μm or less cm³/g (Filter weight basis) | Pore volume at pore diameter of 15 μm or more and 30 μm or less cm³/cc (Filter volume basis) | Pore volume at pore diameter of 7 μm or less cm³/g (Filter weight basis) | Pore volume at pore diameter of 7 μm or less cm³/cc (Filter volume basis) |
| Example 1 | 15 | 85 | 159 | 6.2 | 0.446 | 1.52 | 0.68 | 0.47 | 0.21 | 0.40 | 0.18 |
| Example 2 | 14 | 60 | 152 | 6.3 | 0.450 | 1.44 | 0.65 | 0.43 | 0.19 | 0.34 | 0.15 |
| Example 3 | 18 | 55 | 152 | 3.2 | 0.450 | 1.46 | 0.66 | 0.29 | 0.13 | 0.39 | 0.18 |
| Example 4 | 15 | 86 | 164 | 6.0 | 0.465 | 1.38 | 0.64 | 0.49 | 0.23 | 0.37 | 0.17 |
| Example 5 | 18 | 45 | 130 | 3.1 | 0.454 | 1.51 | 0.69 | 0.34 | 0.15 | 0.37 | 0.17 |
| Example 6 | 18 | 44 | 120 | 2.4 | 0.454 | 1.38 | 0.63 | 0.32 | 0.15 | 0.32 | 0.15 |

TABLE 3-continued

| | Adsorption filter performance | | | | | | | |
|---|---|---|---|---|---|---|---|---|
| | Turbidness removal rate life (L/cc) | Turbidness clogging life (L/cc) | Turbidness removal rate life (L/cc) ※ with Backwash work | Turbidness clogging life (L/cc) ※ with Backwash work | Ultrafine particle removal rate life (L/cc) | Initial water flow resistance (MPa) | VOC removal rate life (L/cc) | Lead removal rate life (L/cc) |
| Example 1 | >25.5 | 25.2 | >33.8 | >33.8 | >30.0 | 0.027 | 20.5 | 17.3 |
| Example 2 | >23.2 | 21.3 | >32.4 | >32.4 | >30.0 | 0.028 | 22.6 | 22.8 |
| Example 3 | >15.6 | 14.2 | >28.2 | 27.1 | >30.0 | 0.035 | 24.1 | 22.6 |
| Example 4 | >33.6 | 33.3 | >35.3 | 35.3 | >30.0 | 0.026 | 21.6 | 26.8 |
| Example 5 | >18.4 | 18.4 | >27.5 | 27.3 | >30.0 | 0.031 | 26.0 | 26.4 |
| Example 6 | >16.8 | 15.6 | >17.6 | 16.7 | >30.0 | 0.033 | 27.0 | 27.1 |

TABLE 4

| | Adsorption filter physical properties | | | | | | | | | | |
|---|---|---|---|---|---|---|---|---|---|---|---|
| | Physical properties of activated carbon as raw material | | | | | Mercury porosimeter | | | | | |
| | | | | | | Total pore volume | | Pore volume at pore diameter of 15 μm or more and 30 μm or less | | Pore volume at pore diameter of 7 μm or less | |
| | D10 (μm) | D50 (μm) | D90 (μm) | Particle content rate (volme %) at particle diameter of 10 μm or less | Filter density (g/cc) | cm³/g (Filter weight basis) | cm³/cc (Filter volume basis) | cm³/g (Filter weight basis) | cm³/cc (Filter volume basis) | cm³/g (Filter weight basis) | cm³/cc (Filter volume basis) |
| Comparative Example 1 | 16 | 32 | 58 | 2.6 | 0.437 | 1.55 | 0.68 | 0.11 | 0.05 | 0.42 | 0.18 |
| Comparative Example 2 | 13 | 108 | 194 | 7.4 | 0.420 | 1.57 | 0.66 | 0.82 | 0.34 | 0.24 | 0.10 |
| Comparative Example 3 | 72 | 138 | 215 | 0.0 | 0.375 | 1.91 | 0.72 | 0.21 | 0.08 | 0.22 | 0.08 |
| Comparative Example 4 | 24 | 58 | 149 | 0.1 | 0.442 | 1.50 | 0.66 | 0.60 | 0.26 | 0.25 | 0.11 |
| Comparative Example 5 | 10 | 32 | 66 | 9.8 | 0.456 | 1.49 | 0.68 | 0.09 | 0.04 | 0.50 | 0.23 |

| | Adsorption filter performance | | | | | | | |
|---|---|---|---|---|---|---|---|---|
| | Turbidness removal rate life (L/cc) | Turbidness clogging life (L/cc) | Turbidness removal rate life (L/cc) ※ with Backwash work | Turbidness clogging life (L/cc) ※ with Backwash work | Ultrafine particle removal rate life (L/cc) | Initial water flow resistance (MPa) | VOC removal rate life (L/cc) | Lead removal rate life (L/cc) |
| Comparative Example 1 | >12.5 | 10.2 | >15.1 | 15.0 | >30.0 | 0.040 | 27.1 | >30.0 |
| Comparative Example 2 | 0.0 | >37.4 | 0.0 | >33.5 | 4.5 | 0.012 | 13.7 | 15.3 |
| Comparative Example 3 | 0.0 | >45.7 | 0.0 | >43.4 | 0.0 | 0.003 | 9.8 | 7.0 |
| Comparative Example 4 | 2.5 | >36.9 | 9.6 | >35.1 | 25.1 | 0.017 | 25.1 | 26.5 |
| Comparative Example 5 | >7.2 | 5.8 | >7.4 | 7.0 | >30.0 | 0.068 | 28.0 | >30.0 |

Figure 5:
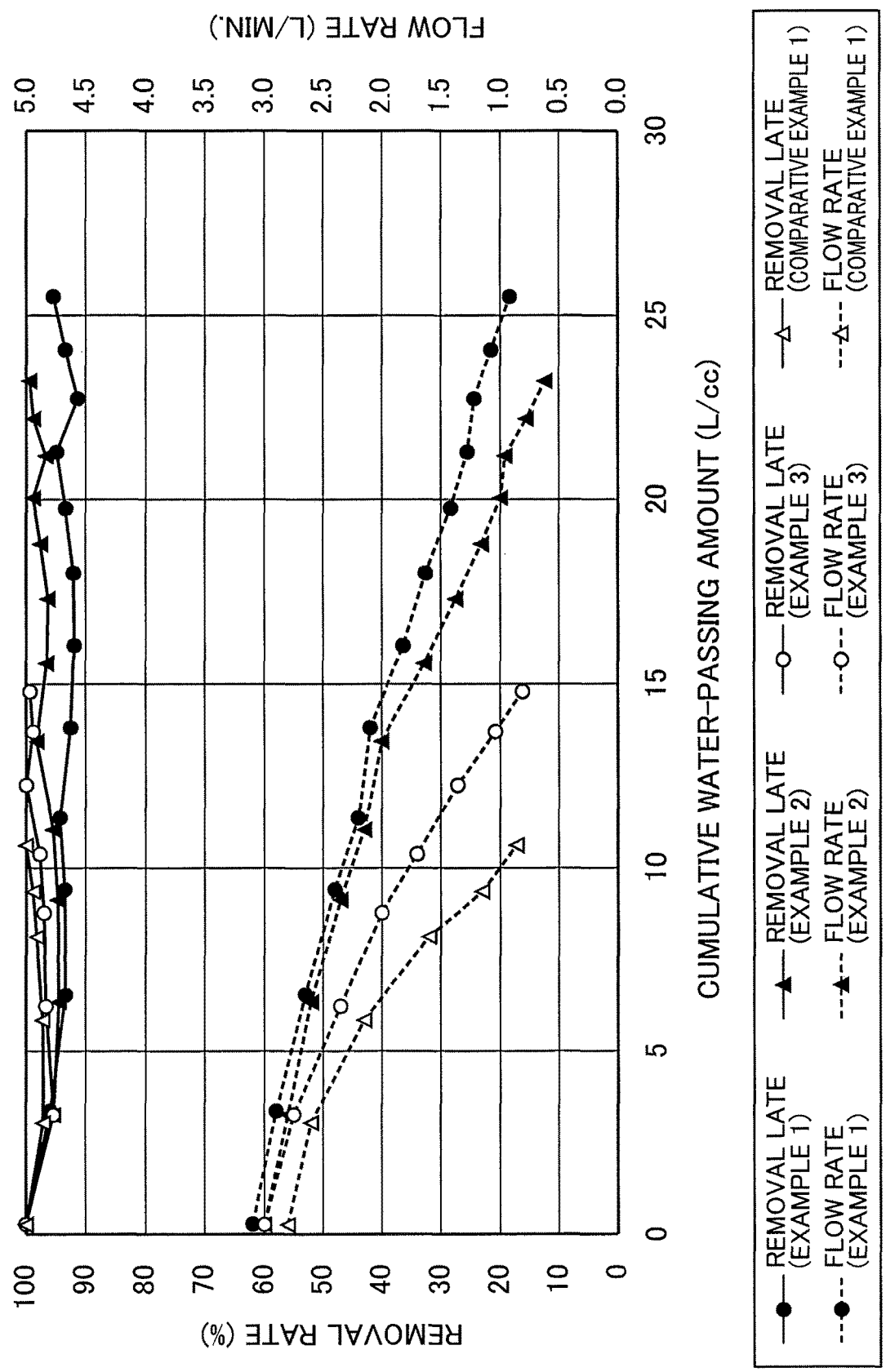
FIG. 5 is a graph showing a water-passing test result concerning test water containing a turbid substance in Example 1 to Example 3 and Comparative Example 1.
Figure 6:
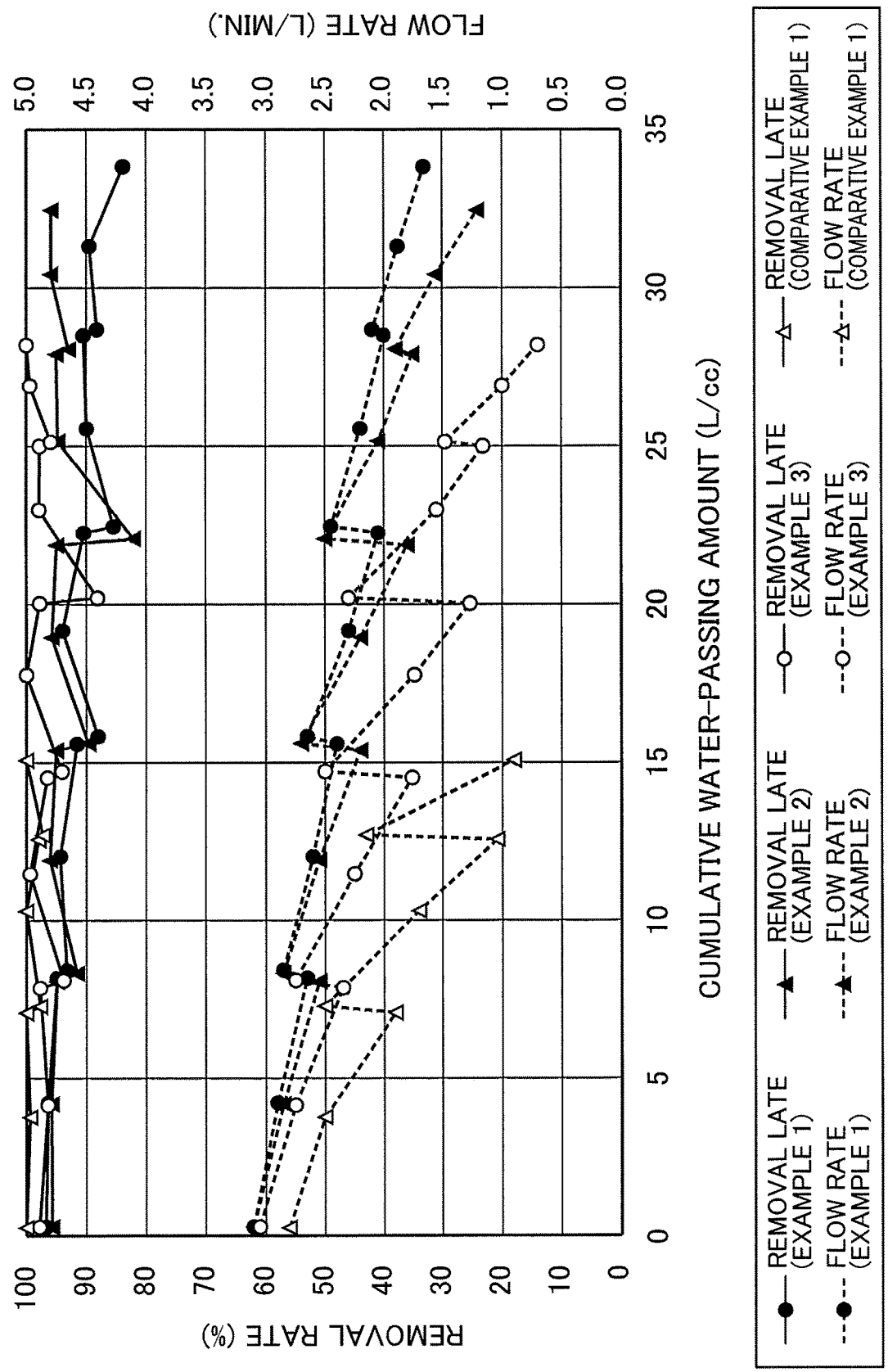
FIG. 6 is a graph showing a water-passing test result concerning test water containing a turbid substance in performing a backwash work in Example 1 to Example 3 and Comparative Example 1.
Figure 7:
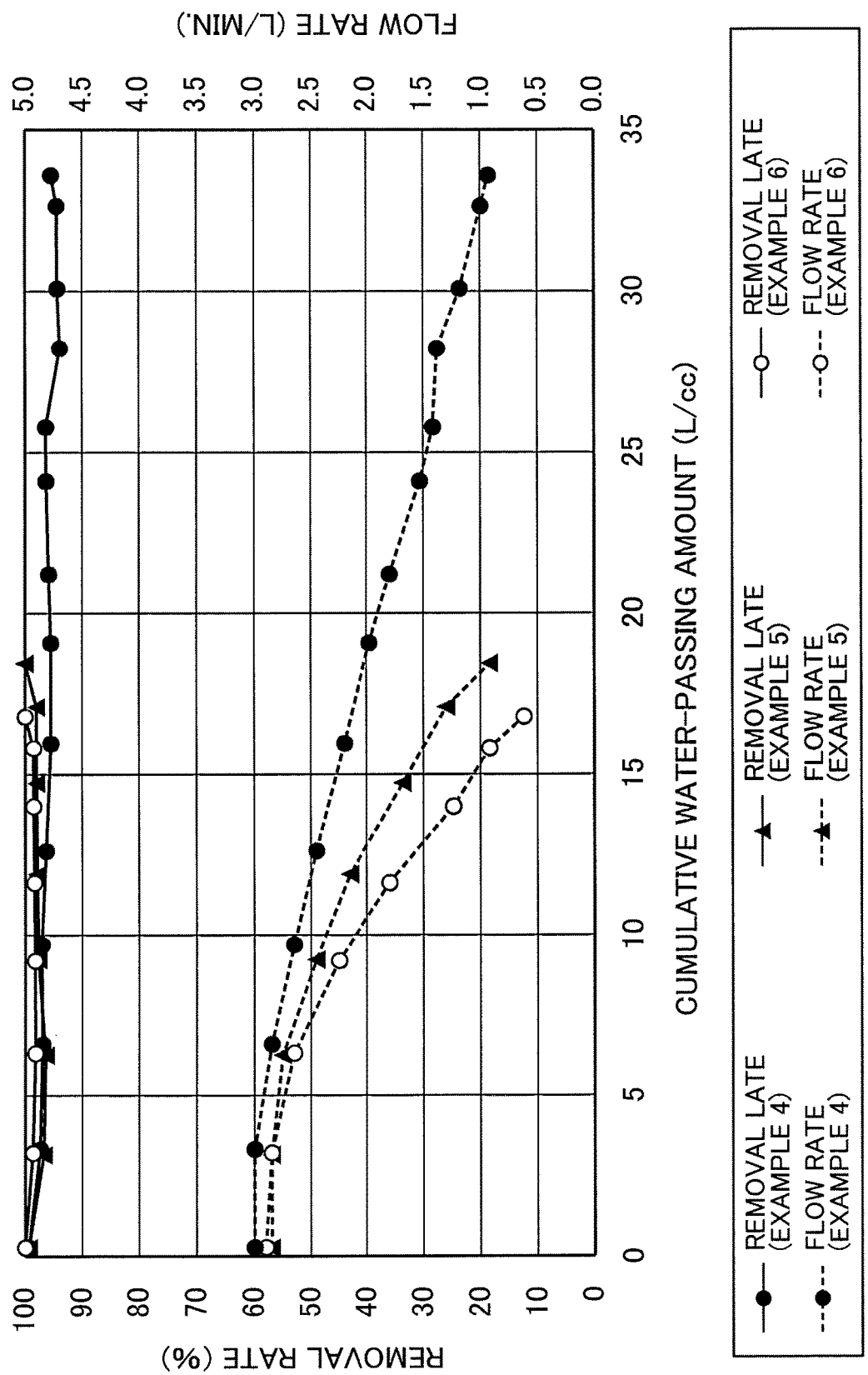
FIG. 7 is a graph showing a water-passing test result concerning test water containing a turbid substance in Example 4 to Example 6.
Figure 8:
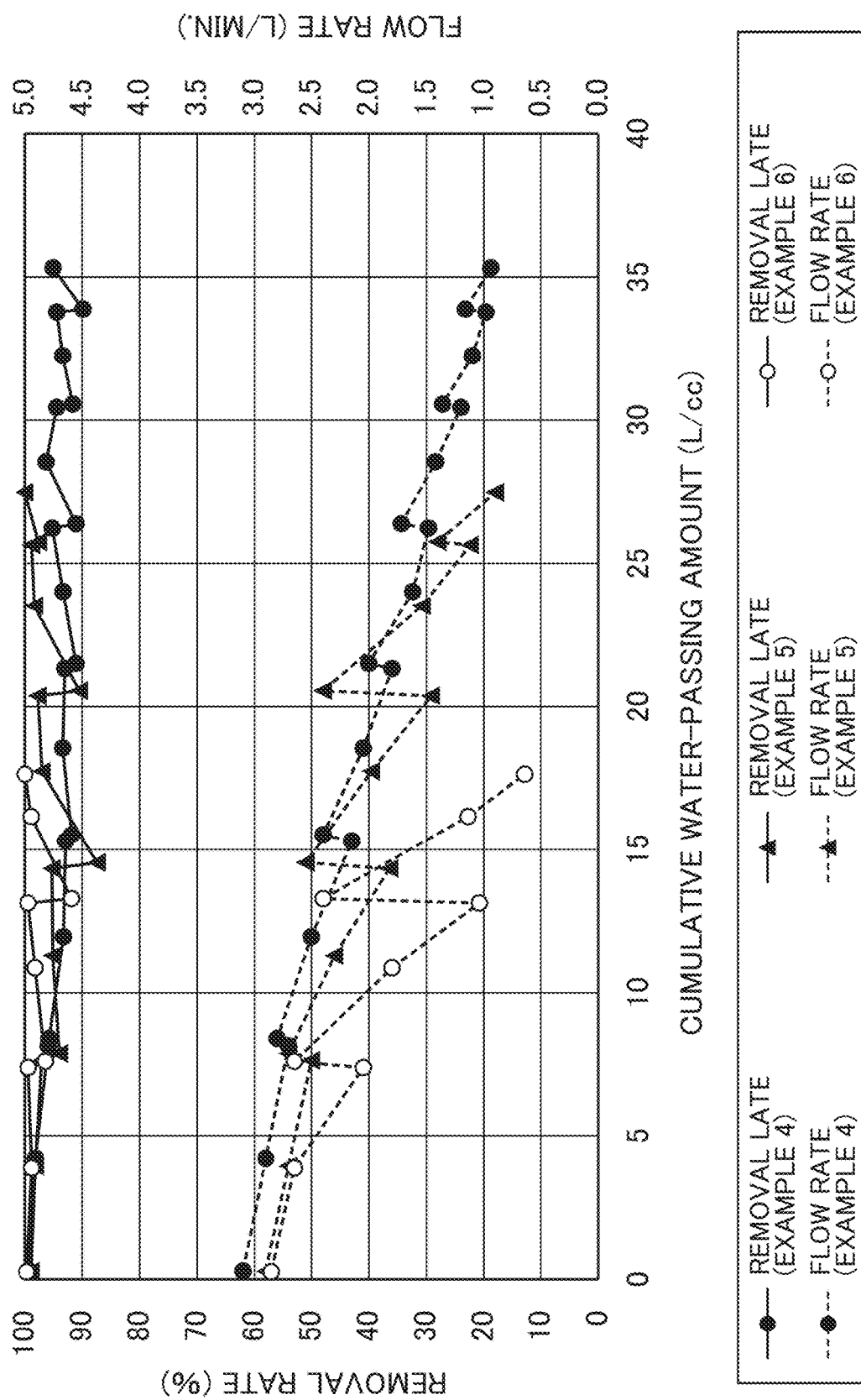
FIG. 8 is a graph showing a water-passing test result concerning test water containing a turbid substance in performing a backwash work in Example 4 to Example 6.
Figure 9:
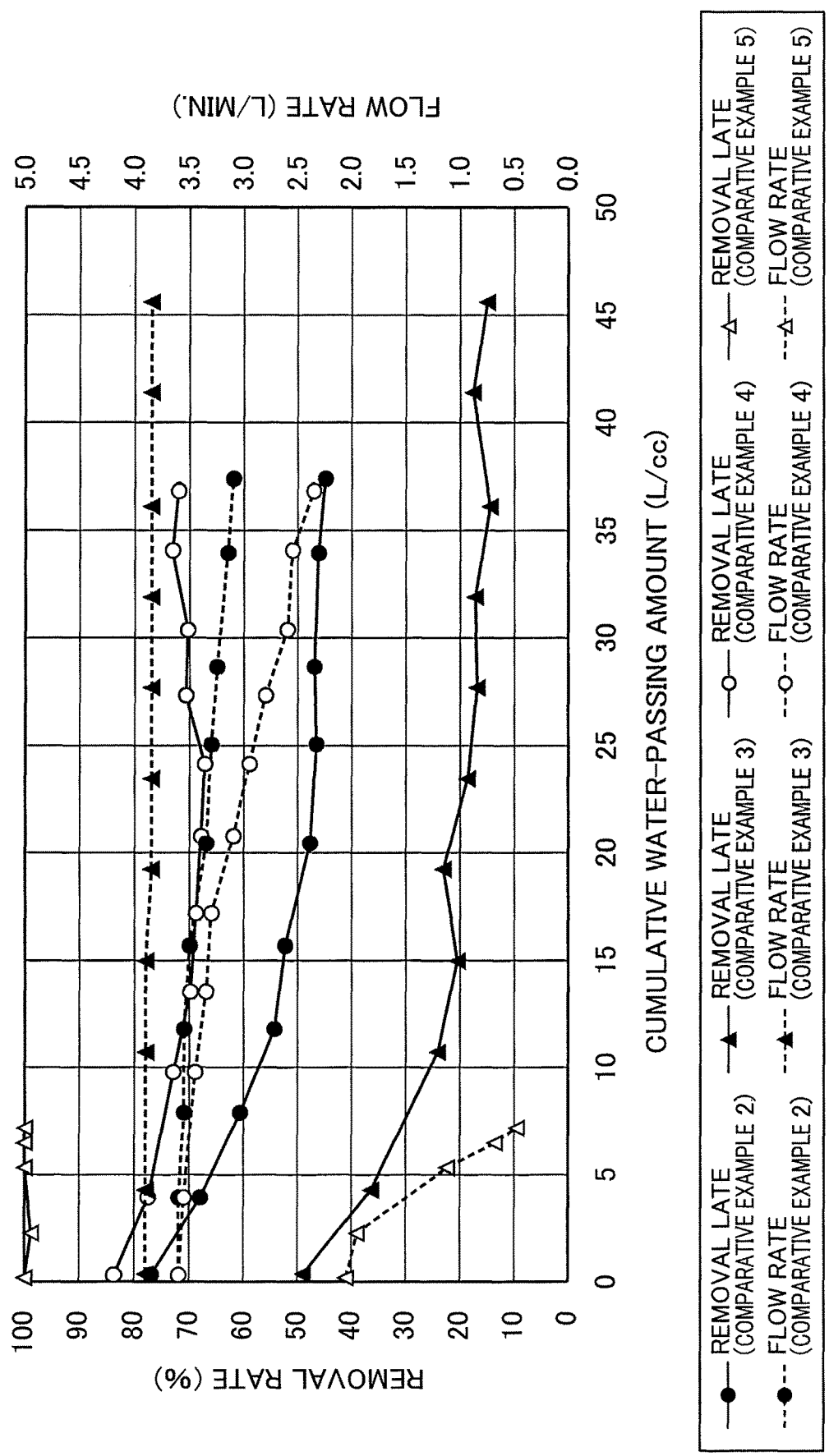
FIG. 9 is a graph showing a water-passing test result concerning test water containing a turbid substance in Comparative Example 2 to Comparative Example 5.
Figure 10:
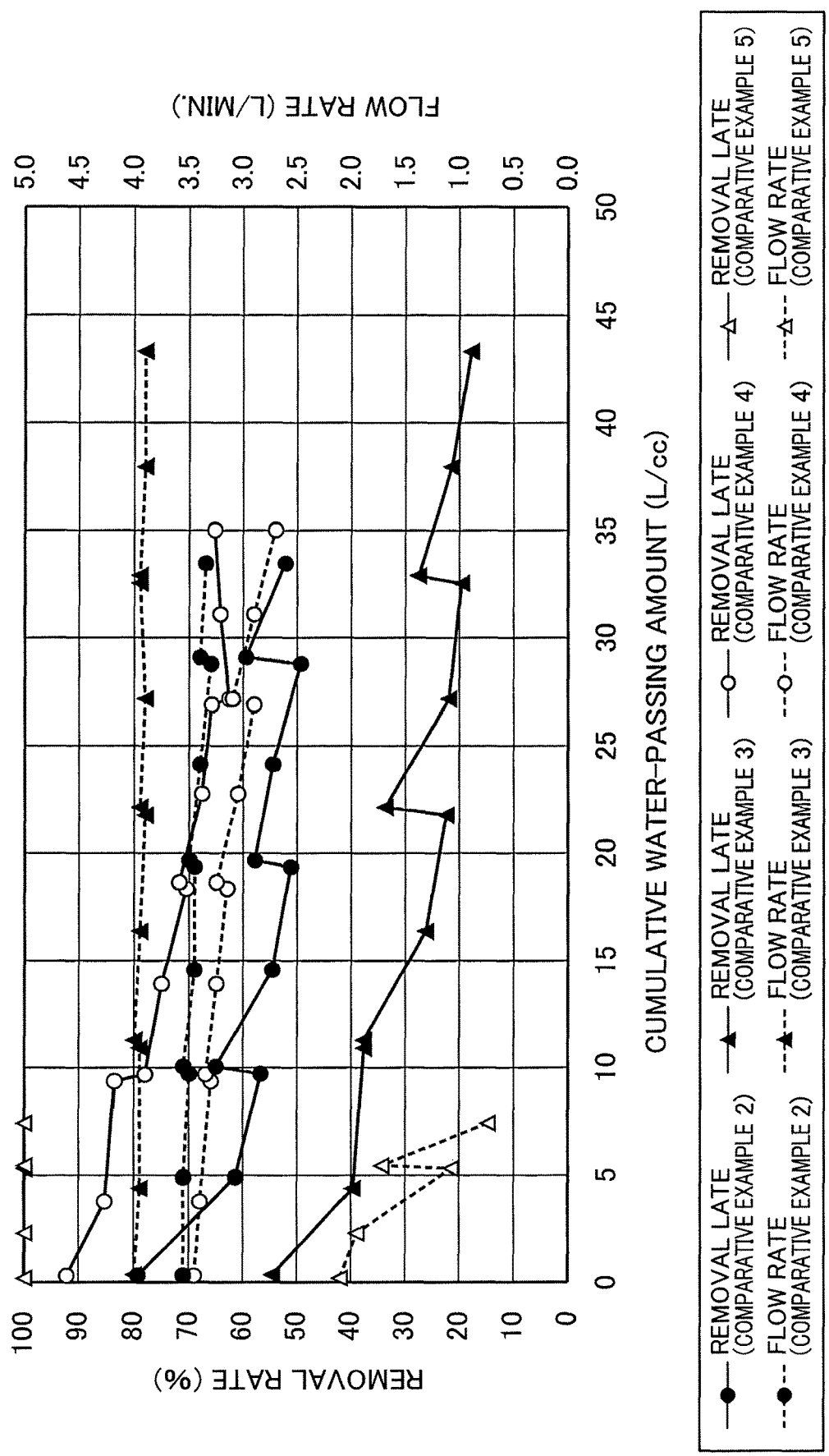
FIG. 10 is a graph showing a water-passing test result concerning test water containing a turbid substance in performing a backwash work in Comparative Example 2 to Comparative Example 5.

Furthermore, FIG. 5 shows a graph of a water-passing test result concerning test water containing a turbid substance in Example 1 to Example 3 and Comparative Example 1. FIG. 6 shows a graph of a water-passing test result concerning test water containing a turbid substance in performing a backwash work in Example 1 to Example 3 and Comparative Example 1. FIG. 7 shows a graph of a water-passing test result concerning test water containing a turbid substance in Example 4 to Example 6. FIG. 8 shows a graph of a water-passing test result concerning test water containing a turbid substance in performing a backwash work in Example 4 to Example 6. FIG. 9 shows a graph of a water-passing test result concerning test water containing a turbid substance in Comparative Example 2 to Comparative Example 5. FIG. 10 shows a graph of a water-passing test result concerning test water containing a turbid substance in performing a backwash work in Comparative Example 2 to Comparative Example 5.

[Discussion]

As shown in Table 3, the adsorption filter in each of Example 1 to Example 6 has a pore volume falling within a range from 0.06 cm$^3$ to 0.30 cm$^3$/cc at a pore diameter of 15 μm or more and 30 μm or less. Moreover, activated carbon, i.e., the powdered activated carbon A to F as a raw material, of the adsorption filter in each of Example 1 to Example 6 satisfies all the conditions of: D50 of 30 μm or more and 110 μm or less; D90 of 110 μm or more; and a particle content rate of 1.2 volume % or more and 8.9 volume % or less at a particle diameter of 10 μm or less. In contrast, the adsorption filter in each of Comparative Example 1 to Comparative Example 5 has a pore volume being out of the range from 0.06 cm$^3$/cc to 0.30 cm$^3$/cc at the pore diameter of 15 μm or more and 30 μm or less, or fails to satisfy the conditions of the activated carbon as a raw material: D50 of 30 μm or more and 110 μm or less; D90 of 110 μm or more; and a particle content rate of 1.2 volume % or more and 8.9 volume % or less at the particle diameter of 10 μm or less.

As shown in Table 3 and Table 4, and in FIG. 5 and FIG. 7, the adsorption filter in each of Example 1 to Example 6 had a superior removal performance on a turbid substance as well as on an ultrafine particle and had a superior water permeability for a longer time in comparison with the adsorption filter in Comparative Example 1. Furthermore, as shown in Table 3 and Table 4, the adsorption filter in each of Example 1 to Example 6 had lower initial water flow resistance than the adsorption filter in Comparative Example 1. It is assumed that this is because, even though the adsorption filter in Comparative Example 1 containing the activated carbon as a raw material with a smaller particle size could remove the ultrafine particle in the same manner as the adsorption filter in Example 1 to Example 6, the filter had clogging by turbid substance, an inferior water permeability, and eventually a shorter adsorption filter life.

As shown in Table 3, and in FIG. 6 and FIG. 8, the adsorption filter in each of Example 1 to Example 6 could highly effectively restore a flow rate owing to the backwash work, and maintain the great turbidness removal performance for a longer time. In contrast, it is assumed that the adsorption filter in Comparative Example 1 containing the activated carbon as a raw material with a smaller particle size and having a less likelihood of discharging a turbid substance even through performing a backwash work could not finally obtain a sufficiently longer adsorption filter life.

The adsorption filter in Comparative Example 2 had a superior water permeability, but had an inferior turbid substance removal performance (including the performance in performing a backwash work as well) and an inferior ultrafine particle removal performance to the adsorption filter in each of Example 1 to Example 6, and further had a shorter filter life than the adsorption filter in each of Example 1 to Example 6. It is assumed that this is because the pore diameter of the adsorption filter was distributed in a larger region than a region in each of Example 1 to Example 6.

The adsorption filter in Comparative Example 3 also had a superior water permeability, but had an inferior turbid substance removal performance (including the performance in performing a backwash work as well) and an inferior ultrafine particle removal performance to the adsorption filter in each of Example 1 to Example 6, and further had a shorter filter life than the adsorption filter in Example 1 to Example 6. It is assumed that this is because the activated carbon as a raw material had a notably larger particle size than the activated carbon in each of Example 1 to Example 6.

The adsorption filter in Comparative Example 4 had an inferior turbid substance removal performance (including the performance in performing a backwash work as well) to and a shorter filter life than the adsorption filter in each of Example 1 to Example 6. It is assumed that this is because the particle content rate of the activated carbon as a raw material at the particle diameter of 10 μm or less was much lower than the particle content rates in Example 1 to Example 6.

The adsorption filter in Comparative Example 5 had more clogging, an inferior water permeability, and a shorter filter life attributed to a turbid substance in comparison with the adsorption filter in each of Example 1 to Example 6. It is assumed that this is because the activated carbon as a raw material had a smaller particle size than the particle size of the activated carbon in each Example 1 to Example 6 in the same manner as Comparative Example 1.

As shown in Table 3, the adsorption filter in each of Example 1 to Example 6 had a great removal performance on the VOC and a great removal performance on a lead corresponding to a harmful substance for a long time.

This application is based on Japanese Patent Application No. 2022-053499 filed in Japan Patent Office on Mar. 29, 2022, the entire disclosure of which are hereby incorporated by reference.

Although the present invention has been appropriately and fully described by way of example with reference to the above-described embodiments and specific examples to express the present invention, it is to be understood that various changes and/or modifications to the embodiments and examples will be apparent to those skilled in the art. Therefore, unless otherwise such changes and modifications to be made by those skilled in the art depart from the scope of the present invention hereinafter defined, they should be construed as being included therein.

INDUSTRIAL APPLICABILITY

An adsorption filter in the present invention is preferably applicable to a water purification cartridge including a housing to be filled with the filter to remove harmful substances contained in tap water, such as free residual chlorine, volatile organic compounds (VOC) including trihalomethanes, agricultural chemicals, and musty odors.

The invention claimed is:
1. An adsorption filter, comprising:
a molded body containing activated carbon and one or more binders, wherein the activated carbon has a D50 of 30 μm or more and 110 μm or less in a cumulative particle size distribution at a volume basis of the activated carbon, a pore volume of the adsorption filter at a pore diameter of 15 μm or more and 30 μm or less at a volume basis of the adsorption filter measured by mercury intrusion porosimetry is 0.06 cm$^3$/cc to 0.30 cm$^3$/cc, and a pore volume of the adsorption filter at a pore diameter of 7 μm or less at a volume basis of the adsorption filter measured by the mercury intrusion porosimetry is not less than 0.12 cm$^3$/cc.

2. An adsorption filter, comprising:

a molded body containing activated carbon and one or more binders, wherein the activated carbon has a D50 of 30 μm or more and 110 μm or less and a D90 of not less than 110 μm in a cumulative particle size distribution at a volume basis of the activated carbon, a particle content rate of the activated carbon at a particle diameter of 10 μm or less is 1.2 volume % or more and 8.9 volume % or less, and a pore volume of the adsorption filter at a pore diameter of 7 μm or less at a volume basis of the adsorption filter measured by mercury intrusion porosimetry is not less than 0.12 cm$^3$/cc.

3. The adsorption filter according to claim 1, wherein the activated carbon has a D90 of not less than 110 μm in the cumulative particle size distribution at a volume basis of the activated carbon, and a particle content rate of the activated carbon at a particle diameter of 10 μm or less is 1.2 volume % or more and 8.9 volume % or less.

4. The adsorption filter according to claim 1, wherein the adsorption filter has a benzene saturated adsorption amount of not more than 30%.

5. The adsorption filter according to claim 2, wherein the adsorption filter has a benzene saturated adsorption amount of not more than 30%.

* * * * *